US011465645B2

(12) United States Patent
Yamane et al.

(10) Patent No.: US 11,465,645 B2
(45) Date of Patent: Oct. 11, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Katsuyasu Yamane, Wako (JP); Yasushi Shoda, Wako (JP); Junpei Noguchi, Wako (JP); Yuki Hara, Wako (JP); Yoshitaka Mimura, Wako (JP); Hiroshi Yamanaka, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 16/801,194

(22) Filed: Feb. 26, 2020

(65) Prior Publication Data

US 2020/0276987 A1 Sep. 3, 2020

(30) Foreign Application Priority Data

Feb. 28, 2019 (JP) .............................. JP2019-035575

(51) Int. Cl.
*B60W 60/00* (2020.01)
*B60W 10/04* (2006.01)
(Continued)

(52) U.S. Cl.
CPC ........... *B60W 60/0016* (2020.02); *B60Q 3/70* (2017.02); *B60W 10/04* (2013.01); *B60W 10/20* (2013.01);
(Continued)

(58) Field of Classification Search
None
See application file for complete search history.

(56) References Cited

U.S. PATENT DOCUMENTS

| 10,354,455 B1 * | 7/2019 | Chan ..................... G08G 1/146 |
| 2017/0057516 A1 * | 3/2017 | Gordon ................ A61B 5/0245 |

(Continued)

FOREIGN PATENT DOCUMENTS

| JP | 2008-009913 | 1/2008 |
| JP | 2008-275491 | 11/2008 |

(Continued)

OTHER PUBLICATIONS

Japanese Office Action for Japanese Patent Application No. 2019-035575 dated May 10, 2022.

*Primary Examiner* — James J Lee
*Assistant Examiner* — Tawri M Matsushige
(74) *Attorney, Agent, or Firm* — Amin, Turocy & Watson, LLP

(57) ABSTRACT

A vehicle control system includes: a recognizer that recognizes a surrounding environment of a vehicle; and a driving controller that performs speed control and steering control of the vehicle automatically on the basis of a recognition result obtained by the recognizer. When the vehicle is moved to a boarding position at which an occupant boards the vehicle and is stopped, the driving controller stops the vehicle on the basis of at least one of weather information at the boarding position, a state of the occupant recognized by the recognizer, and an environment of the boarding position recognized by the recognizer and determines a stopping position of the vehicle according to the environment of the boarding position or the state of the occupant when the weather information is a predetermined state.

12 Claims, 13 Drawing Sheets

(51) Int. Cl.
    *B60W 10/20*     (2006.01)
    *G05D 1/00*     (2006.01)
    *B60W 50/14*     (2020.01)
    *B60Q 3/70*     (2017.01)
    *G06V 20/56*     (2022.01)
    *B60W 50/00*     (2006.01)

(52) U.S. Cl.
    CPC ............. *B60W 50/14* (2013.01); *G06V 20/56* (2022.01); *B60W 2050/0075* (2013.01); *B60W 2420/42* (2013.01); *B60W 2540/041* (2020.02); *B60W 2555/20* (2020.02); *B60W 2556/45* (2020.02); *G05D 1/0055* (2013.01); *G05D 1/0088* (2013.01)

(56) References Cited

U.S. PATENT DOCUMENTS

| | | | | |
|---|---|---|---|---|
| 2017/0330111 | A1* | 11/2017 | Vogel | G06Q 10/02 |
| 2018/0136656 | A1* | 5/2018 | Rasmusson, Jr | G05D 1/0246 |
| 2018/0194343 | A1* | 7/2018 | Lorenz | G05D 1/0282 |
| 2018/0354411 | A1* | 12/2018 | Shmueli Friedland | G05D 1/0246 |
| 2019/0197325 | A1* | 6/2019 | Reiley | G08B 13/19602 |
| 2019/0265703 | A1* | 8/2019 | Hicok | G06Q 50/30 |
| 2020/0004245 | A1* | 1/2020 | Rychtyckyj | G05D 1/0088 |
| 2020/0041303 | A1* | 2/2020 | Friedman | G01C 21/3697 |
| 2020/0043344 | A1* | 2/2020 | Shimizu | G08G 1/00 |
| 2020/0080855 | A1* | 3/2020 | Pandit | G01C 21/3453 |
| 2020/0269663 | A1* | 8/2020 | Urano | G05D 1/0088 |
| 2020/0269861 | A1* | 8/2020 | Liffman | G05D 1/0214 |

FOREIGN PATENT DOCUMENTS

| | | |
|---|---|---|
| JP | 2016-043772 | 4/2016 |
| JP | 2018-065441 | 4/2018 |

\* cited by examiner

FIG. 5

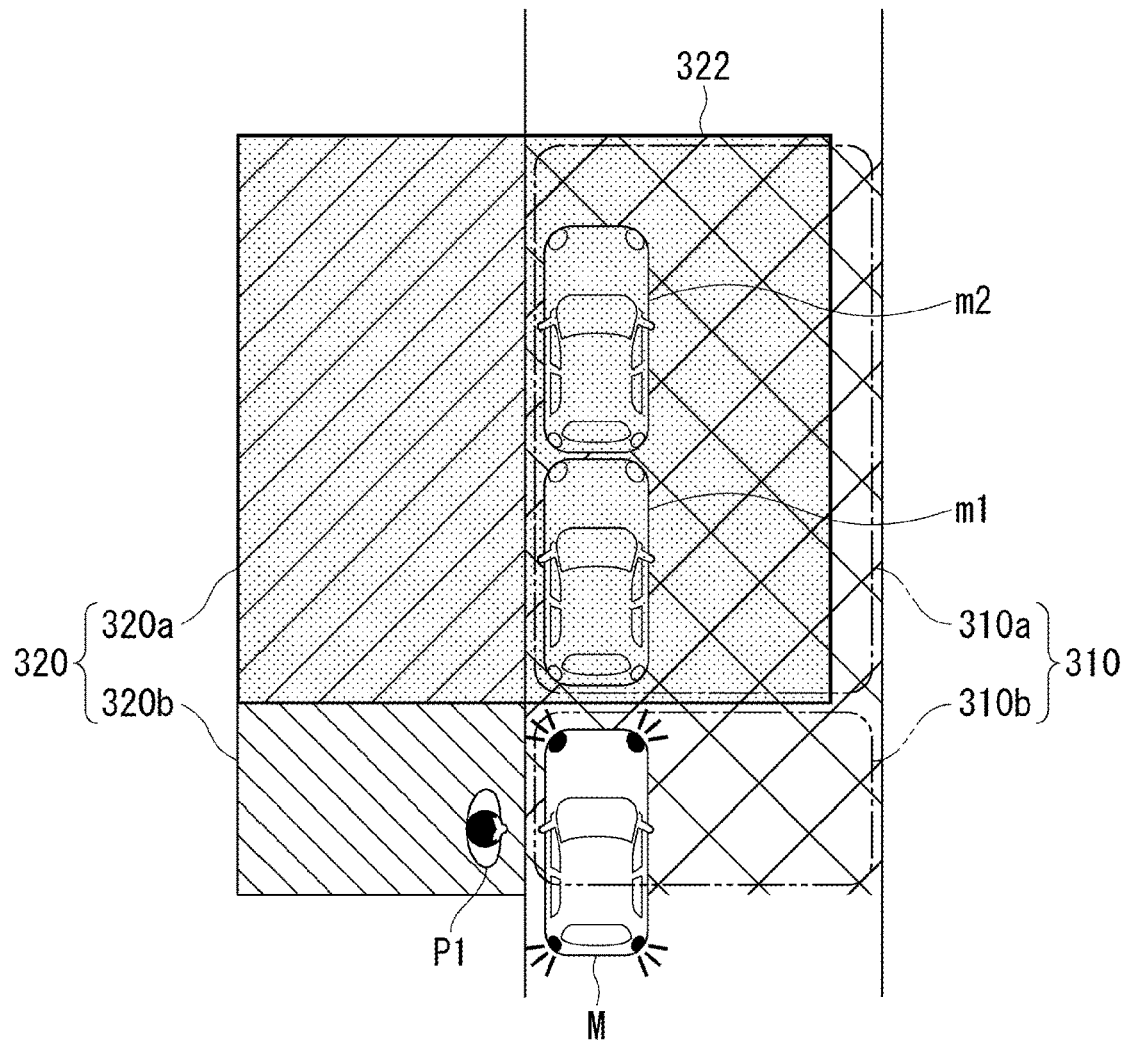

FIG. 6

| EXTERNAL ENVIRONMENT | OCCUPANT STATE | STOPPING MODE |
|---|---|---|
| RAINFALL PHENOMENON IS OCCURRING | OCCUPANT IS NOT WEARING (OR CARRYING) RAINCOAT | FIRST STOPPING MODE |
| | OCCUPANT IS CARRYING LUGGAGE WHICH IS DESIRABLY NOT EXPOSED TO RAIN | |
| | OCCUPANT IS WEARING (OR CARRYING) RAINCOAT | SECOND STOPPING MODE |
| | OCCUPANT IS CARRYING LUGGAGE FOR WHICH IT IS ACCEPTABLE IF IT BECOMES WET IN RAIN | |
| SUN IS SHINING AT BOARDING POSITION | OCCUPANT IS WEARING (OR CARRYING) ANTI-SUNLIGHT ARTICLES | |

182

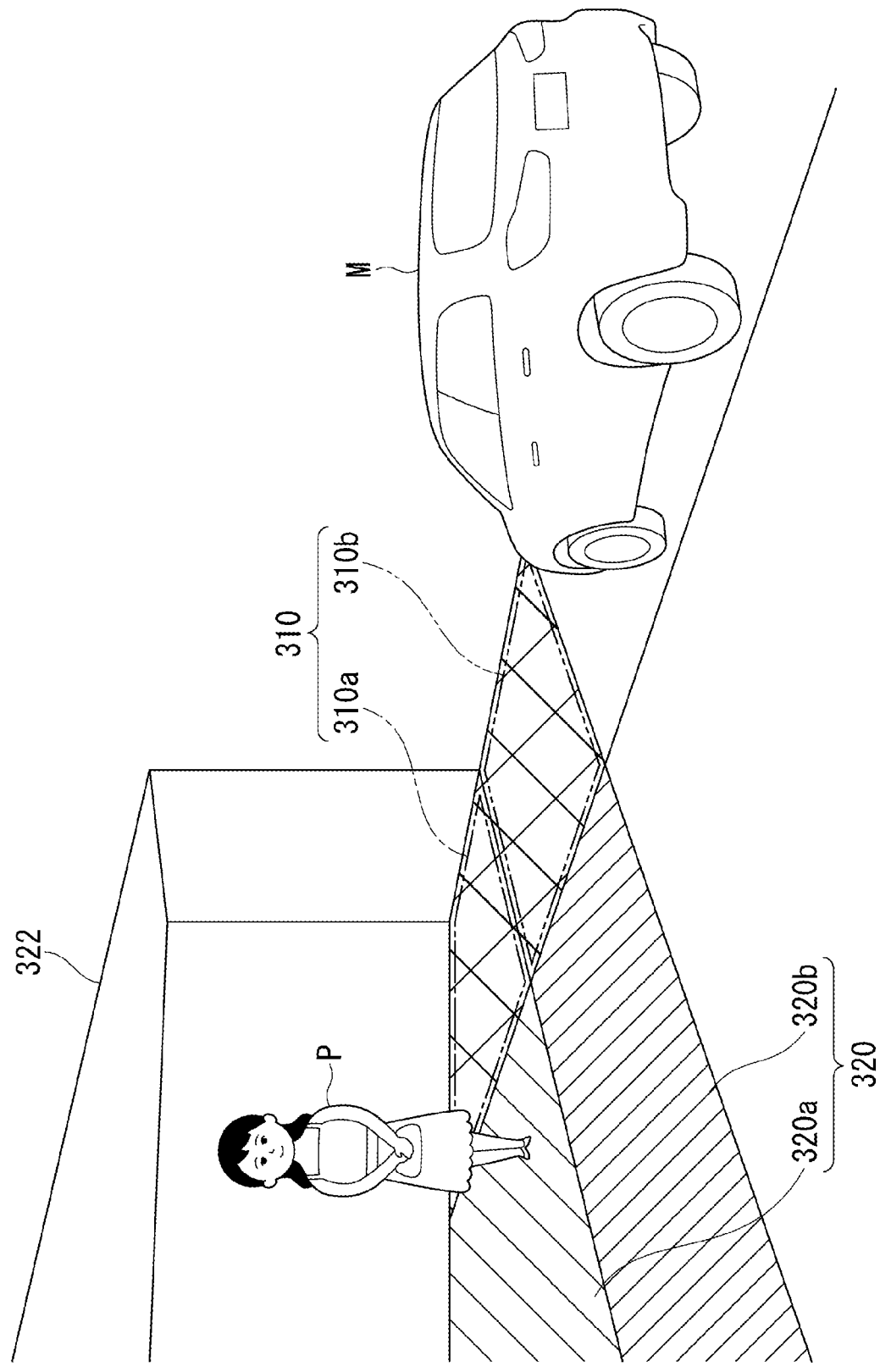

VEHICLE CONTROL SYSTEM, VEHICLE CONTROL METHOD, AND STORAGE MEDIUM

CROSS-REFERENCE TO RELATED APPLICATION

This application claims priority to and the benefit from Japanese Patent Application No. 2019-035575, filed on Feb. 28, 2019, the contents of which are hereby incorporated by reference into the present application.

BACKGROUND

Field of the Invention

The present invention relates to a vehicle control system, a vehicle control method, and a storage medium.

Description of Related Art

In recent years, research on automatically controlling vehicles has progressed. In this context, a technique for controlling a vehicle such that it stops at a position at which an occupant is not exposed to snow or rain when causing the vehicle to move to a position at which an occupant boards the vehicle and stopping the vehicle according to automated driving is known (for example, see Japanese Patent Application Publication No. 2008-009913).

SUMMARY

Here, when an occupant boards a vehicle, if the occupant is carrying an umbrella or wearing a raincoat if it is snowing or raining, there may be a case in which the vehicle does not have to stop at a position at which the occupant is not exposed to snow or rain. However, in the conventional technique, although it is possible to stop the vehicle on the basis of the influence of an external environment, it is difficult to determine a stopping position on the basis of the state of an occupant.

The present invention has been made in consideration of these circumstances and one object thereof is to provide a vehicle control system, a vehicle control method, and a storage medium capable of allowing an occupant to board a vehicle smoothly depending on the state of the occupant.

A vehicle control system, a vehicle control method, and a storage medium according to the present invention employ the following configuration.

(1) As a first aspect of the present invention, a vehicle control system is provided including: a recognizer that recognizes a surrounding environment of a vehicle; and a driving controller that performs speed control and steering control of the vehicle automatically on the basis of a recognition result obtained by the recognizer, wherein when the vehicle is moved to a boarding position at which an occupant boards the vehicle and is stopped, the driving controller stops the vehicle on the basis of at least one of weather information at the boarding position, a state of the occupant recognized by the recognizer, and an environment of the boarding position recognized by the recognizer and determines a stopping position of the vehicle according to the environment of the boarding position or the state of the occupant when the weather information is a predetermined state.

(2) In the aspect of (1), the environment of the boarding position includes the presence of eaves at the boarding position, and when the weather information indicates that the weather at the boarding position is bad, the driving controller determines the stopping position of the vehicle on the basis of the presence of eaves recognized by the recognizer and the state of the occupant.

(3) In the aspect of (1), the state of the occupant includes luggage carried by the occupant or an appearance of the occupant, and when the luggage recognized by the recognizer is luggage which is desirably not exposed to an external environment or when the appearance of the occupant recognized by the recognizer is an appearance which is desirably not exposed to an external environment, the driving controller stops the vehicle at a position at which the occupant is not or hardly influenced by the external environment.

(4) In the aspect of (1), the environment of the boarding position includes a degree of sunlight at the boarding position, and when the degree of sunlight recognized by the recognizer is determined to be equal to or larger than a predetermined reference value, the driving controller stops the vehicle at a position at which the occupant is not or hardly hit by sunlight.

(5) In the aspect of (1), the environment of the boarding position includes a degree of sunlight at the boarding position, the system further includes an estimator that estimates the degree of sunlight at the boarding position in each time period, and when the degree of sunlight estimated by the estimator is determined to be equal to or larger than a predetermined reference value, the driving controller stops the vehicle at a position at which the occupant is not or hardly hit by sunlight.

(6) In the aspect of (1), when a plurality of boarding positions are present, the driving controller stops the vehicle near the boarding position of which the environment is recognized to be better than the other boarding positions by the recognizer.

(7) In the aspect of (1), when influence of an external environment recognized by the recognizer is larger than a predetermined reference, the driving controller executes a process of determining a stopping position of the vehicle.

(8) In the aspect of (1), the vehicle control system further includes a notificator that notifies a terminal device carried by the occupant of various pieces of information, wherein the driving controller moves and stops the vehicle at a boarding position at an instruction time instructed by the occupant, and when the weather information indicates that the weather at the instruction time is bad, the notificator notifies the terminal device of information proposing to change the instruction time.

(9) In the aspect of (8), the notificator sends a notification to the terminal device, the notification being related to asking whether the occupant will board the vehicle at a boarding position at which the occupant is not or hardly influenced by the external environment or a boarding position at which the occupant is influenced by the external environment, and the driving controller stops the vehicle at a position at which the occupant is not or hardly influenced by the external environment or a position at which the occupant is influenced by the external environment on the basis of information acquired from the terminal device in response to the notification of the notificator.

(10) In the aspect of (9), when the vehicle is moved to a boarding position at which an occupant boards the vehicle and is stopped, the notificator sends the notification related to the asking if congestion is expected at a boarding position at which the occupant is not or hardly influenced by the external environment.

(11) In the aspect of (1), the vehicle control system further includes an illumination controller that controls an illumination provided in the vehicle, wherein when the vehicle is moved to the boarding position by the driving controller and the occupant of the vehicle is recognized by the recognizer, the illumination controller lights the illumination according to a predetermined lighting mode to notify the occupant of arrival of the vehicle.

(12) A vehicle control method according to an aspect of the present invention causes a computer to execute: recognizing a surrounding environment of a vehicle; automatically performing speed control and steering control of the vehicle on the basis of a recognition result; when the vehicle is moved to a boarding position at which an occupant boards the vehicle and is stopped, stopping the vehicle on the basis of at least one of weather information at the boarding position, a recognized state of the occupant, and a recognized environment of the boarding position; and determining a stopping position of the vehicle according to the environment at the boarding position or the state of the occupant when the weather information is a predetermined state.

(13) A storage medium according to an aspect of the present invention is a computer-readable non-transitory storage medium storing a program for causing a computer to execute: recognizing a surrounding environment of a vehicle; automatically performing speed control and steering control of the vehicle on the basis of a recognition result; when the vehicle is moved to a boarding position at which an occupant boards the vehicle and is stopped, stopping the vehicle on the basis of at least one of weather information at the boarding position, a recognized state of the occupant, and a recognized environment of the boarding position; and determining a stopping position of the vehicle according to the environment at the boarding position or the state of the occupant when the weather information is a predetermined state.

According to aspects (1) to (10), it is possible to allow an occupant to board the host vehicle smoothly according to the state of the occupant.

According to aspect (5), it is possible to allow an occupant to board the host vehicle in a better environment.

According to aspect (8), it is possible to the occupant to easily recognize that the host vehicle has arrived at the stopping position and allow the occupant to smoothly board the host vehicle.

BRIEF DESCRIPTION OF THE DRAWINGS

FIG. 5 is a diagram illustrating an example of a scene in which a host vehicle M stops near an occupant P and under eaves 322.

FIG. 6 is a diagram illustrating an example of the content of correspondence information 182.

FIG. 7 is a diagram illustrating an example of a scene in which a drive-in parking controller 142 stops the host vehicle M according to a first stopping mode.

DESCRIPTION OF EMBODIMENTS

Embodiments

Hereinafter, embodiments of a vehicle control system, a vehicle control method, and a storage medium of the present invention will be described with reference to the drawings. Although a case in which vehicles drive on the left side of a road will be described, left and right may be reversed for a case in which vehicles drive on the right side of a road.
[Overall Configuration]

Figure 1:
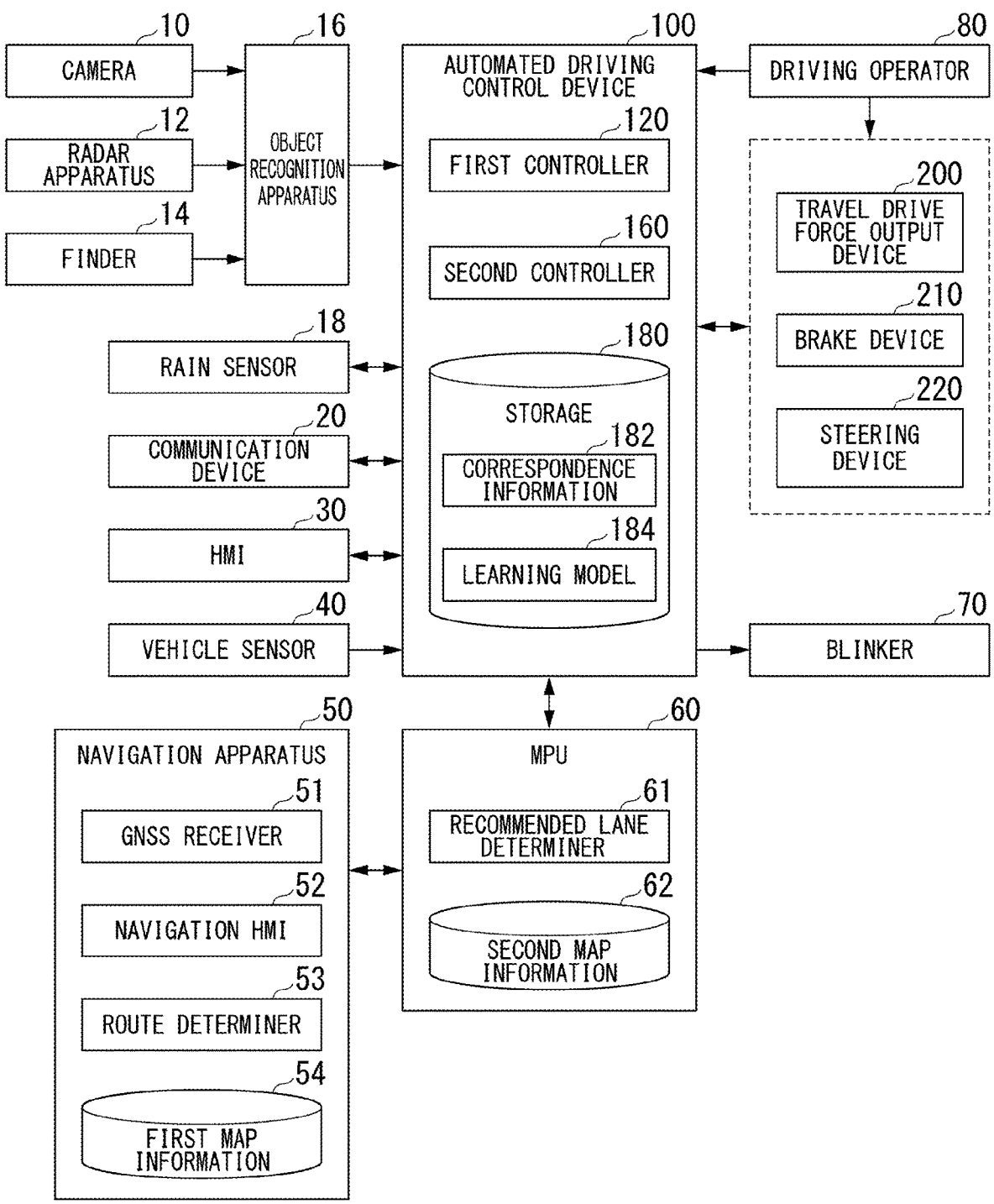
FIG. 1 is a block diagram of a vehicle control system 1 which uses a vehicle control device according to an embodiment.

FIG. 1 is a block diagram of a vehicle control system 1 which uses a vehicle control device according to an embodiment.

A vehicle in which the vehicle control system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or an electric power discharged by secondary batteries or fuel-cell batteries.

The vehicle control system 1 includes, for example, a camera 10, a radar apparatus 12, a finder 14, an object recognition apparatus 16, a rain sensor 18, a communication device 20, a human machine interface (HMI) 30, a vehicle sensor 40, a navigation apparatus 50, a map positioning unit (MPU) 60, a blinker 70, a driving operator 80, an automated driving control device 100, a travel drive force output device 200, a brake device 210, and a steering device 220. These apparatuses and devices are connected to each other by a multiplex communication line such as a controller area network (CAN) communication line, a serial communication line, a wireless communication network, and the like. Moreover, the components illustrated in FIG. 1 are examples only, some components may be omitted and other components may be added.

The camera 10 is, for example, a digital camera which uses a solid-state imaging device such as a charge coupled device (CCD) or a complementary metal oxide semiconductor (CMOS). The camera 10 is attached to an arbitrary position of a vehicle (hereinafter referred to as a host vehicle M) in which the vehicle control system 1 is mounted. The camera 10, for example, captures the images around the host vehicle M repeatedly and periodically. The camera 10 may be a stereo camera.

The radar apparatus 12 emits radio waves such as millimeter waves to the surroundings of the host vehicle M and detects radio waves (reflected waves) reflected from an object to detect at least the position (the distance and direction) of the object. One or a plurality of radar apparatuses 12 are attached to arbitrary positions of the host vehicle M. The radar apparatus 12 may detect the position and the speed of an object according to a frequency modulated continuous wave (FM-CW) method.

The finder 14 is a light detection and ranging. The finder 14 radiates light to the periphery of the host vehicle M and measures scattering light. The finder 14 detects the distance to an object on the basis of the time taken to receive light after the light was emitted. The radiated light is pulsating laser light, for example. The finder 14 is attached to an arbitrary position on the host vehicle M.

The object recognition apparatus 16 performs sensor fusion processing on detection results obtained by some or all of the camera 10, the radar apparatus 12, and the finder 14 to recognize the position, the kind, the speed, and the like of an object. The object recognition apparatus 16 outputs the recognition results to the automated driving control device 100. The object recognition apparatus 16 may output the detection results obtained by the camera 10, the radar apparatus 12, and the finder 14 to the automated driving control device 100 as they are. The object recognition apparatus 16 may be omitted from the vehicle control system 1.

The communication device 20, for example, communicates with other vehicles present around the host vehicle M, a parking area management device (to be described later), or various server devices using a cellular network, a Wi-Fi network, Bluetooth (registered trademark), a dedicated short range communication (DSRC), or the like.

A rain sensor 18 is provided on a vehicle-interior side of a front window, for example, to radiate infrared rays toward the front window and receive infrared rays reflected from the front window or raindrops to detect the amount of rainfall. The rain sensor 18 may be provided at a position other than the front window as long as it is possible to detect the amount of rainfall. When the amount of rainfall can be detected on the basis of a surrounding situation of the host vehicle M imaged by the camera 10, the vehicle control system 1 may not include the rain sensor 18.

The HMI 30 presents various pieces of information to an occupant of the host vehicle M and receives input operations of the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects an acceleration, a yaw-rate sensor that detects an angular speed about a vertical axis, an azimuth sensor that detects the direction of the host vehicle M, and the like.

The navigation apparatus 50 includes, for example, a global navigation satellite system (GNSS) receiver 51, a navigation HMI 52, and a route determiner 53. The navigation apparatus 50 stores first map information 54 in a storage device such as a hard disk drive (HDD) or a flash memory. The GNSS receiver 51 specifies the position of the host vehicle M on the basis of signals received from GNSS satellites. The position of the host vehicle M may be specified or complemented by an inertial navigation system (INS) which uses the output of the vehicle sensor 40. The navigation HMI 52 includes a display device, a speaker, a touch panel, keys, and the like. The navigation HMI 52 may be partially or entirely shared with the HMI 30. For example, the route determiner 53 determines a route (hereinafter a map route) from the position (or an input arbitrary position) of the host vehicle M specified by the GNSS receiver 51 to a destination input by an occupant using the navigation HMI 52 by referring to the first map information 54. The first map information 54 is information in which a road shape is represented by links indicating roads and nodes connected by links. The first map information 54 may include the curvature of a road, point of interest (POI) information, and the like. The map route is output to the MPU 60. The navigation apparatus 50 may perform route guidance using the navigation HMI 52 on the basis of the map route. The navigation apparatus 50 may be realized by the functions of a terminal device such as a smartphone or a tablet terminal held by a user (hereinafter referred to as a terminal device TM). The navigation apparatus 50 may transmit a present position and a destination to a navigation server via the communication device 20 and acquire a route equivalent to a map route from the navigation server.

The MPU 60 includes a recommended lane determiner 61, for example, and stores second map information 62 in a storage device such as a HDD or a flash memory. The recommended lane determiner 61 divides the map route provided from the navigation apparatus 50 into a plurality of blocks (for example, the route may be partitioned every 100 [m] in relation to a vehicle traveling direction) and determines a recommended lane for each block by referring to the second map information 62. The recommended lane determiner 61 determines that the host vehicle is traveling in a certain lane from the left. When a branching point is present on a map route, the recommended lane determiner 61 determines a recommended lane so that the host vehicle M can travel along a reasonable route for proceeding to a branch destination.

The second map information 62 is map information with higher accuracy than the first map information 54. The second map information 62 includes, for example, information on the center of a lane or information on the boundaries of a lane. The second map information 62 may include road information, traffic regulation information, address information (address and postal codes), facility information, telephone number information, and the like. The second map information 62 may be updated as necessary by the communication device 20 communicating with other devices.

The blinker 70 is a light indicating a traveling direction of the host vehicle M to persons or vehicles present around the host vehicle M. A lighting mode of the blinker 70 is controlled on the basis of the control of the automated driving control device 100, for example.

The driving operator 80 includes, for example, a steering wheel SW, an acceleration pedal, a brake pedal, a shift lever, a deformed steering wheel, a joystick, and other operators. Sensors that detect an amount of operation or the presence of an operation are attached to the driving operator 80, and the detection results are output to any one or both of the automated driving control device 100 or the travel drive force output device 200, the brake device 210, and the steering device 220.

The automated driving control device 100 includes, for example, a first controller 120, a second controller 160, a wiper controller 170, and a storage 180. The first controller 120 and the second controller 160 each are realized when a hardware processor such as a central processing unit (CPU)

or the like executes a program (software). Some or all of these components may be realized by hardware (a circuit portion; including circuitry) such as large scale integration (LSI), an application specific integrated circuit (ASIC), a field-programmable gate array (FPGA), or a graphics processing unit (GPU) and may be realized by the cooperation of software and hardware. The program may be stored in advance in a storage device (a storage device including a non-transitory storage medium) such as a HDD or a flash memory of the automated driving control device 100 and may be stored in a removable storage medium such as a DVD or a CD-ROM and be installed in a HDD or a flash memory of the automated driving control device 100 when a storage medium (a storage device including a non-transitory storage medium) is attached to a drive device. Correspondence information 182 and a learning model 184 are stored in the storage 180. The details of the correspondence information 182 and the learning model 184 will be described later.

Figure 2:
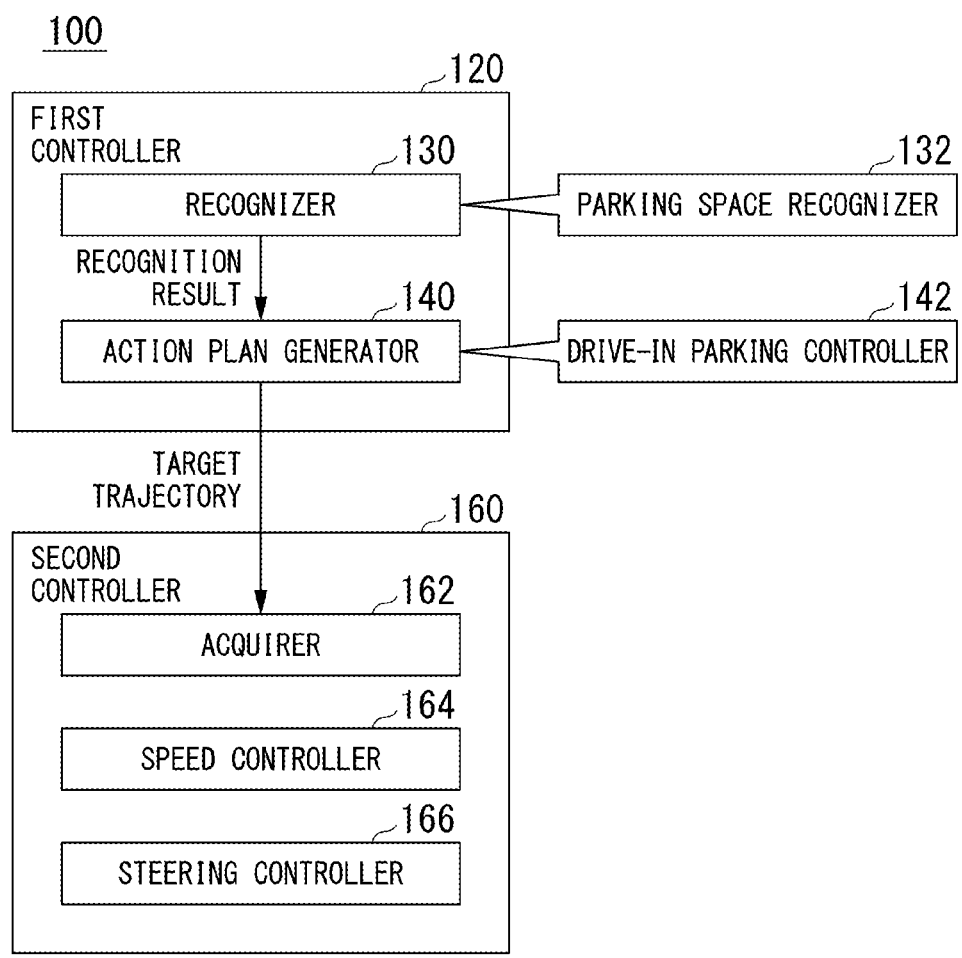
FIG. 2 is a diagram illustrating a functional configuration of a first controller 120 and a second controller 160.

FIG. 2 is a diagram illustrating a functional configuration of the first controller 120 and the second controller 160. For example, the first controller 120 includes a recognizer 130 and an action plan generator 140. For example, the first controller 120 realizes the functions of artificial intelligence (AI) and the functions of a predetermined model in parallel. For example, a function of "recognizing an intersection" may be realized by executing recognition of an intersection by deep learning and recognition based on a predetermined condition (signals, road marks, and the like which can be subjected to pattern matching) in parallel and scoring both recognition results to make comprehensive evaluation. In this way, the reliability of automated driving is secured. The recognizer 130 recognizes the state such as a position of an object around the host vehicle M, a speed, an acceleration, and the like on the basis of the information input from the camera 10, the radar apparatus 12, and the finder 14 via the object recognition apparatus 16. The object position is recognized as the position on an absolute coordinate system in which a representative point (the center of gravity, the center of a driving shaft, or the like) of the host vehicle M is at the origin, for example, and is used for control. The object position may be represented by a representative point such as the center of gravity or a corner of the object and may be represented by a region. The "state" of an object may include the acceleration or a jerk of an object or an "action state" (for example, whether the object has changed or is trying to change lanes).

For example, the recognizer 130 recognizes a lane (a traveling lane) in which the host vehicle M is traveling. For example, the recognizer 130 recognizes the traveling lane by comparing a pattern (for example, an arrangement of solid lines and broken lines) of lane marks obtained from the second map information 62 and a pattern of lane marks around the host vehicle M recognized from the images captured by the camera 10. The recognizer 130 may recognize the traveling lane by recognizing runway boundaries (road boundaries) including lane marks, road shoulders, curbs, a median strip, guard rails, and the like without being limited to the lane marks. In this recognition, the position of the host vehicle M acquired from the navigation apparatus 50 and the processing results of the INS may be also taken into consideration. The recognizer 130 recognizes a temporary stop line, an obstacle, a red sign, a toll booth, and other road events.

When recognizing the traveling lane, the recognizer 130 recognizes the position and a direction of the host vehicle M in relation to the traveling lane. For example, the recognizer 130 may recognize an offset from a lane center of a reference point of the host vehicle M and an angle between the traveling direction of the host vehicle M and an extension line of the lane center as the relative position and the direction of the host vehicle M in relation to the traveling lane. Instead of this, the recognizer 130 may recognize the position or the like of the reference point of the host vehicle M in relation to any one of side ends (lane marks or road boundaries) of the traveling lane as the relative position of the host vehicle M in relation to the traveling lane.

The recognizer 130 includes a parking space recognizer 132 that is activated in a drive-in parking event to be described later. The details of the function of the parking space recognizer 132 will be described later.

In principle, the action plan generator 140 generates a target trajectory along which the host vehicle M travels in the future automatically (regardless of an operation of a driver) so that the host vehicle M travels in a recommended lane determined by the recommended lane determiner 61 and it is possible to cope with a surrounding situation of the host vehicle M. The target trajectory includes a speed element, for example. For example, the target trajectory is represented as an arrangement of positions (trajectory points) that the host vehicle M has to reach. The trajectory points are positions that the host vehicle M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the host vehicle M has to reach at respective sampling time points of the predetermined sampling periods. In this case, the information of the target speed and the target acceleration is represented by the intervals of the trajectory points.

The action plan generator 140 may set an automated driving event when generating the target trajectory. The automated driving event includes a constant speed travel event, a low-speed following travel event, a lane changing event, a diverging event, a merging event, a takeover event, and a drive-in parking event in which an unmanned vehicle travels and parks during valet parking. The action plan generator 140 generates a target trajectory corresponding to an activated event. The action plan generator 140 includes a drive-in parking controller 142 activated when a drive-in parking event is executed. The details of the function of the drive-in parking controller 142 will be described later.

The second controller 160 controls the travel drive force output device 200, the brake device 210, and the steering device 220 so that the host vehicle M passes along the target trajectory generated by the action plan generator 140 at a scheduled time.

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores the information in a memory (not illustrated). The speed controller 164 controls the travel drive force output device 200 or the brake device 210 on the basis of a speed element included in the target trajectory stored in the memory. The steering controller 166 controls the steering device 220 according to the degree of curving of the target trajectory stored in the memory. The processes of the speed controller 164 and the steering controller 166 are realized by a combination of feedforward control and feedback control, for example. As an example, the steering controller 166 executes feedforward control according to the curvature of a road in front of the host vehicle M and feedback control based on an offset from a target trajectory in combination. A combination of the action plan generator 140 and the second controller 160 is an example of a "driving controller".

The travel drive force output device 200 outputs a travel drive force (torque) for a vehicle to travel to driving wheels. The travel drive force output device 200 includes a combination of an internal combustion engine, an electric motor, and a transmission and an electronic control unit (ECU) that controls these components. The power ECU controls the above-mentioned components according to the information input from the second controller 160 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the second controller 160 or the information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration and may be an electrically-controlled hydraulic-pressure brake device that controls an actuator according to information input from the second controller 160 and delivers hydraulic pressure of the master cylinder to a cylinder.

The steering device 220 includes, for example, a steering ECU and an electric motor. The electric motor, for example, applies a force to a rack-and-pinion mechanism to change the direction of a steering wheel. The steering ECU drives an electric motor according to the information input from the second controller 160 or the information input from the driving operator 80 to change the direction of the steering wheel.

[Drive-in Parking Event: During Entering]

Figure 3:
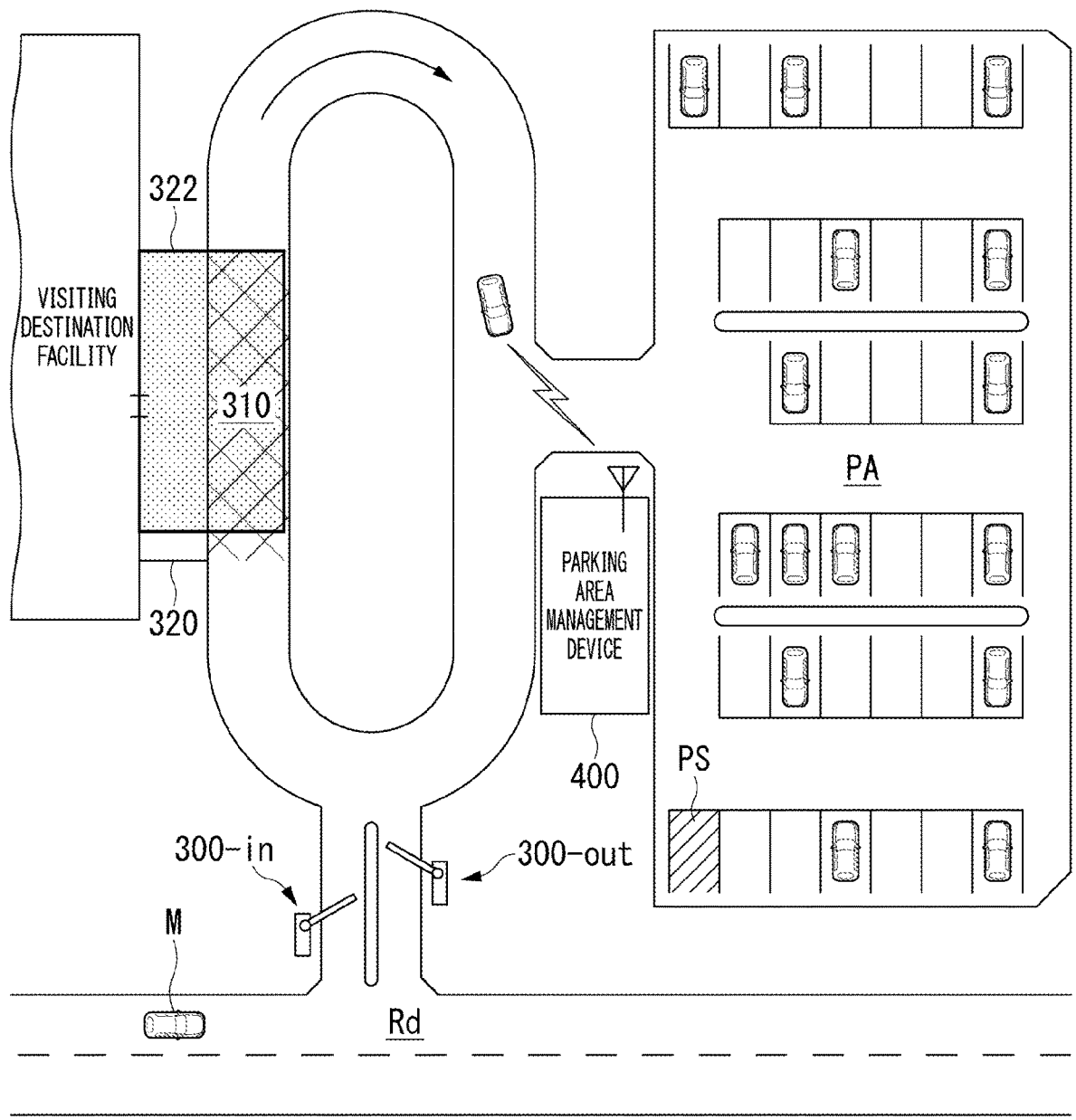
FIG. 3 is a diagram schematically illustrating a scene in which a drive-in parking event is executed.

The drive-in parking controller 142 causes the host vehicle M to park in a parking space on the basis of the information acquired from the parking area management device 400 with the aid of the communication device 20, for example. FIG. 3 is a diagram schematically illustrating a scene in which a drive-in parking event is executed. Gates 300-in and 300-out are provided on a route from a road Rd to a visiting destination facility. The host vehicle M passes through the gate 300-in and proceeds to a stopping area 310 by manual driving or automated driving. The stopping area 310 is near a platform area 320 connected to the visiting destination facility. Eaves 322 for blocking snow and rain are provided in the platform area 320 and the stopping area 310.

After an occupant alights in the stopping area 310, the host vehicle M performs automated driving in an unmanned manner and starts a drive-in parking event of moving to a parking space PS in a parking area PA. The details of a trigger for starting the drive-in parking event associated with entering will be described later. When starting the drive-in parking event, the drive-in parking controller 142 controls the communication device 20 such that a parking request is sent to the parking area management device 400. The host vehicle M moves from the stopping area 310 to the parking area PA according to the guidance of the parking area management device 400 or while performing detection itself.

Figure 4:
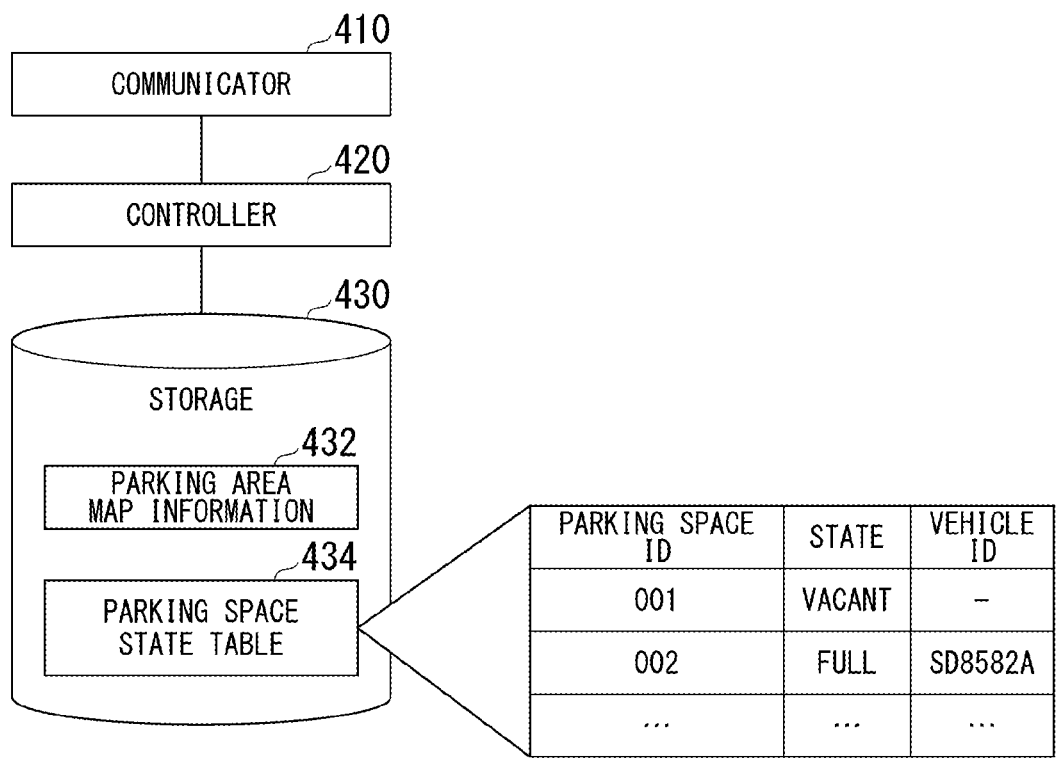
FIG. 4 is a diagram illustrating an example of a configuration of a parking area management device 400.

FIG. 4 is a diagram illustrating an example of a configuration of the parking area management device 400. The parking area management device 400 includes, for example, a communicator 410, a controller 420, and a storage 430. Information such as parking area map information 432 and a parking space state table 434 is stored in the storage 430.

The communicator 410 wirelessly communicates with vehicles other than the host vehicle M. The controller 420 guides the vehicle to the parking space PS on the basis of the information acquired by the communicator 410 and the information stored in the storage 430. The parking area map information 432 is information showing the structure of the parking area PA geometrically. The parking area map information 432 includes the coordinates of respective parking spaces PS. The parking space state table 434 correlates a parking space ID which is identification information of the parking space PS with a state indicating whether the space is in a vacant state or a full (parked in) state and a vehicle ID which is identification information of a parked vehicle in a full state.

When the communicator 410 receives a parking request from the vehicle, the controller 420 extracts a parking space PS in a vacant state by referring to the parking space state table 434, acquires the position of the extracted parking space PS from the parking area map information 432, and transmits an ideal route to the acquired position of the parking space PS to the vehicle using the communicator 410. The controller 420 instructs a specific vehicle to stop or move slowly as necessary on the basis of a positional relationship between a plurality of vehicles so that a plurality of vehicles do not proceed to the same position simultaneously.

In a vehicle (hereinafter referred to as the host vehicle M) having received the route, the drive-in parking controller 142 generates a target trajectory based on the route. When the vehicle comes near the target parking space PS, the parking space recognizer 132 recognizes parking frame lines or the like that define the parking space PS, recognizes a detailed position of the parking space PS, and provides the detailed position to the drive-in parking controller 142. Upon receiving the detailed position, the drive-in parking controller 142 corrects the target trajectory and causes the host vehicle M to be parked in the parking space PS.

[Drive-in Parking Event: During Exiting]

The drive-in parking controller 142 and the communication device 20 maintain an operation state even when the host vehicle M is parking. When the communication device 20 receives a pickup request from a terminal device TM of an occupant, the drive-in parking controller 142 activates the system of the host vehicle M to move the host vehicle M to the stopping area 310. In this case, the drive-in parking controller 142 controls the communication device 20 such that it transmits a start request to the parking area management device 400. The controller 420 of the parking area management device 400 instructs a specific vehicle to stop or move slowly as necessary on the basis of a positional relationship between a plurality of vehicles so that a plurality of vehicles do not proceed to the same position simultaneously similarly to during entering. When the host vehicle M is moved to the stopping area 310 and has an occupant on board, the drive-in parking controller 142 stops operating, and after that, manual driving or automated driving based on another functional unit starts.

Without being limited to the above description, the drive-in parking controller 142 may find a vacant parking space itself on the basis of the detection results obtained by the camera 10, the radar apparatus 12, the finder 14, or the object recognition apparatus 16 regardless of communication and cause the host vehicle M to park in the Found Parking Space.

[Determination of Stopping Position in Drive-in Parking Event]

FIG. 5 is a diagram illustrating an example of a scene in which a host vehicle M stops near an occupant P and under the eaves 322. Hereinafter, a case in which the platform area 320 includes a platform area with eaves 320a which is under the eaves 322 and is not or hardly influenced by an external environment and a platform area without eaves 320b which is not under the eaves 322 and is influenced by an external environment will be described. Moreover, a case in which the stopping area 310 includes a stopping area with eaves 310a which is under the eaves 322 and is not or is hardly influenced by an external environment and a stopping area without eaves 310b which is not under the eaves 322 and which is influenced by an external environment will be described. For example, "being influenced by an external environment" refers to a state in which the occupant P is exposed to (hit by) an substance (rain, snow, soft hail, sleet, hail, or the like) falling on the ground due to a rainfall phenomenon or sunlight hits the occupant P.

In a state of being influenced by an external environment, basically, the drive-in parking controller 142 determines the stopping area with eaves 310a as a stopping position and controls the host vehicle M such that the occupant P from being influenced by the external environment. However, when the host vehicle M is caused to travel up to the vicinity of the stopping area 310 according to the drive-in parking event associated with exiting and a plurality of vehicles (other vehicles m1 to m2 illustrated in the drawing) other than the host vehicle M are present in the stopping area with eaves 310a, it is difficult for the drive-in parking controller 142 to stop the host vehicle M in the stopping area with eaves 310a. In this case, the drive-in parking controller 142 determines the stopping position of the host vehicle M in a first stopping mode or a second stopping mode on the basis of the correspondence information 182, the state of the occupant P, and an environment of the boarding position (in this example, the environments of the platform area 320 and the stopping area 310) recognized by the recognizer 130. The details of the first and second stopping modes are as below.

(First Stopping Mode)

When the host vehicle M cannot stop in the stopping area with eaves 310a because a plurality of other vehicles m are present in the stopping area with eaves 310a, the drive-in parking controller 142 causes the host vehicle M to wait in front of the stopping area without eaves 310b or the stopping area 310 until the host vehicle M can stop in the stopping area with eaves 310a and moves the host vehicle M to the stopping area with eaves 310a to stop the host vehicle M when the host vehicle M can stop in the stopping area with eaves 310a.

(Second Stopping Mode)

When the host vehicle M cannot stop in the stopping area with eaves 310a because a plurality of other vehicles m are present in the stopping area with eaves 310a, the drive-in parking controller 142 moves the host vehicle M to the stopping area without eaves 310b and stops the host vehicle M.

FIG. 6 is a diagram illustrating an example of the content of the correspondence information 182. The correspondence information 182 is information in which the external environment indicated by the recognition result obtained by the recognizer 130, the state of the occupant P indicated by the recognition result of the recognizer 130, and the stopping position are correlated with each other. The details of the content of the correspondence information 182 will be described sequentially. The correspondence information 182 may be stored in the storage 180 in a format such as a table and may be stored in the storage 180 in a form of being embedded in program code.

When the host vehicle M is caused to stop at the determined stopping position, for example, the drive-in parking controller 142 controls a functional unit (not illustrated) that controls lighting of lamps (illuminations) (for example, headlights) of the host vehicle M such that the lamps are lit according to a predetermined lighting mode (for example, flashing (passing)) to notify the occupant P of arrival of the host vehicle M. In this way, the drive-in parking controller 142 can allow the occupant P to recognize the position of the host vehicle M and allow the occupant P to smoothly board the host vehicle M. For example, the drive-in parking controller 142 may control the functional unit that controls lighting of the lamps of the host vehicle M so that a lighting mode of the lamps of the host vehicle M is different in a case in which the host vehicle M stops at the determined stopping position from in a case in which the host vehicle M is stopped in the course of moving to the determined stopping position. For example, the drive-in parking controller 142 may light the blinker 70 as a hazard lamp when the host vehicle M is stopped at the determined stopping position and light the lamps of the host vehicle M in a lighting mode similar to that of an ordinary stopped state (for example, lights a brake light) when the host vehicle M is stopped in the course of moving to the determined stopping position. In this way, the drive-in parking controller 142 can allow the occupant P to easily recognize that the host vehicle M has arrived at the stopping position and allow the occupant P to smoothly board the host vehicle M. The drive-in parking controller 142 is an example of an "illumination controller" in a scene of controlling a functional unit associated with controlling the lighting of the lamps of the host vehicle M.

[Case in which Rainfall Phenomenon is Occurring and Occupant P has not Taken Countermeasures Against Rainfall Phenomenon]

FIG. 7 is a diagram illustrating an example of a scene in which the drive-in parking controller 142 stops the host vehicle M according to a first stopping mode. As illustrated in FIG. 7, the drive-in parking controller 142 causes the host vehicle M to travel up to the vicinity of the stopping area 310 according to a drive-in parking event associated with exiting. The drive-in parking controller 142 determines the first stopping mode as the stopping mode on the basis of the correspondence information 182 and the recognition result obtained by the recognizer 130 when the recognition result obtained by the recognizer 130 indicates that a rainfall phenomenon is occurring and the occupant P is not wearing (or carrying) a raincoat and stops the host vehicle M in the stopping area with eaves 310a. The correspondence information 182 includes information in which a recognition result that the recognizer 130 has recognized that a rainfall phenomenon is occurring, a recognition result that the recognizer 130 has recognized that the occupant P has not taken countermeasures against a rainfall phenomenon, and the first stopping mode are correlated with each other. The fact that "the occupant P has not taken countermeasures against a rainfall phenomenon" includes a fact that the occupant P is not wearing (or carrying) a raincoat and a fact that the occupant P is carrying luggage which desirably is not exposed to rain.

In this case, the recognizer 130 recognizes whether a rainfall phenomenon is occurring at a boarding position on the basis of the detection result obtained by the rain sensor 18. The recognizer 130 recognizes whether the occupant P is wearing (or carrying) a raincoat on the basis of an image indicating a surrounding environment of the host vehicle M captured by the camera 10 and the learning model 184. For example, the learning model 184 is a model used when deriving whether the occupant P has taken countermeasures against an external environment and is a model outputting whether the occupant P has taken countermeasures against an external environment when the image in which the occupant P is captured is input. The learning model 184 performs machine learning using at least one of an image in which a person wearing (or carrying) a raincoat is captured, which is training data of a positive example and an image in which a person not wearing (or carrying) a raincoat is captured, which is training data of a negative example. With the above-described process, the drive-in parking controller 142 can stop the host vehicle M in the platform area with eaves 320a depending on the situation of the occupant P and prevent the occupant P from being exposed to a substance falling on the ground due to a rainfall phenomenon.

[Case in which Rainfall Phenomenon is Occurring and Occupant P has Taken Countermeasures Against Rainfall Phenomenon]

Figure 8:
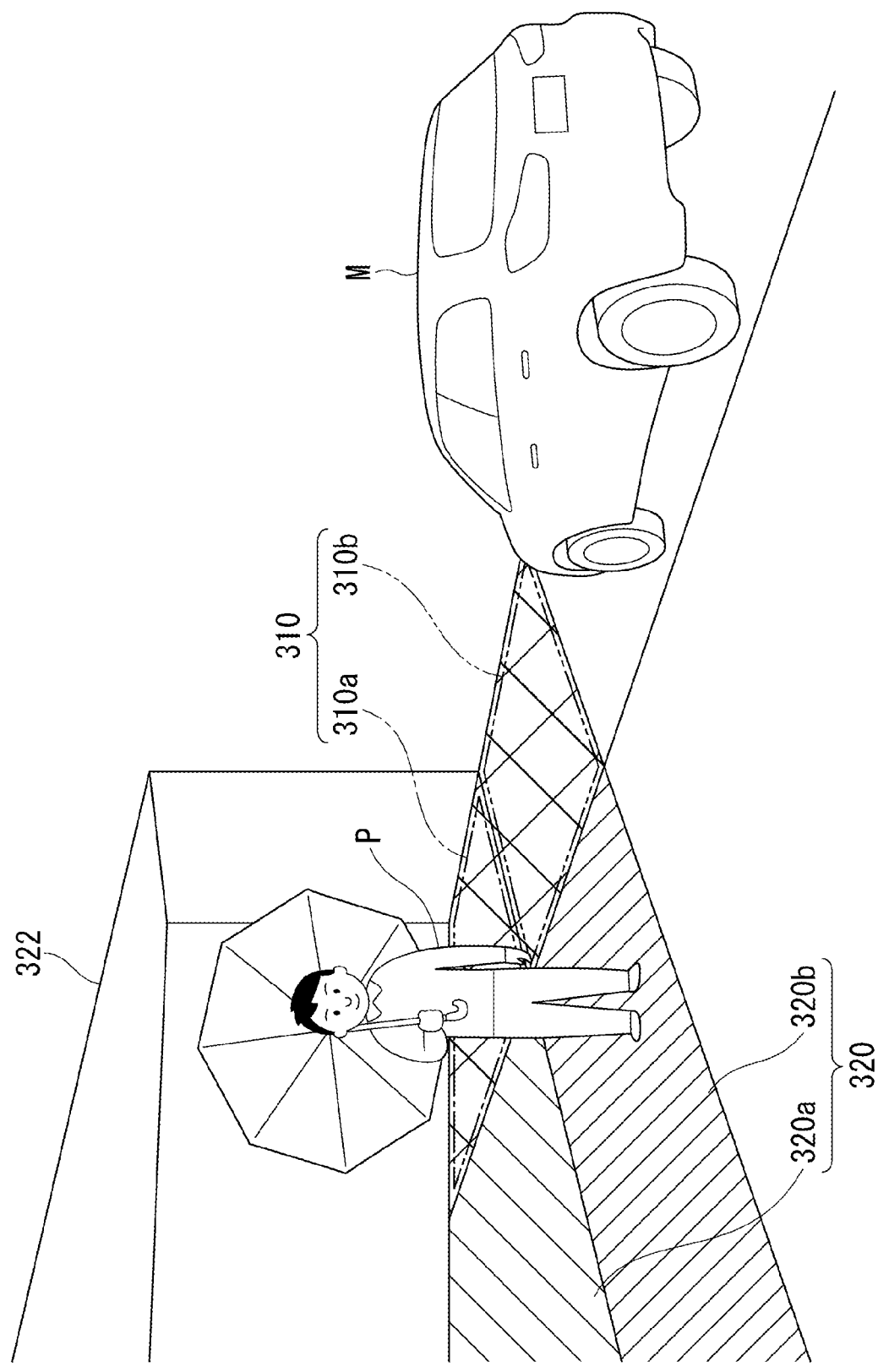
FIG. 8 is a diagram illustrating an example of a scene in which the drive-in parking controller 142 stops the host vehicle M according to a second stopping mode.

FIG. 8 is a diagram illustrating an example of a scene in which the drive-in parking controller 142 stops the host vehicle M according to the second stopping mode. As illustrated in FIG. 8, the drive-in parking controller 142 causes the host vehicle M to travel up to the vicinity of the stopping area 310 according to the drive-in parking event associated with exiting. The drive-in parking controller 142 determines the second stopping mode as the stopping mode on the basis of the correspondence information 182 and the recognition result obtained by the recognizer 130 when the recognition result obtained by the recognizer 130 indicates that a rainfall phenomenon is occurring and the occupant P is wearing (or carrying) a raincoat and stops the host vehicle M in the stopping area without eaves 310b. The correspondence information 182 includes information in which a recognition result that the recognizer 130 has recognized that a rainfall phenomenon is occurring, a recognition result that the recognizer 130 has recognized that the occupant P has taken countermeasures against a rainfall phenomenon, and the second stopping mode are correlated with each other. The fact that "the occupant P has taken countermeasures against a rainfall phenomenon" includes a fact that the occupant P is wearing (or carrying) a raincoat and a fact that the occupant P is carrying luggage for which it is acceptable if it becomes wet in rain.

In this case, the recognizer 130 recognizes whether a rainfall phenomenon is occurring at a boarding position on the basis of the detection result obtained by the rain sensor 18. The recognizer 130 recognizes whether the occupant P is wearing (or carrying) a raincoat on the basis of an image indicating a surrounding environment of the host vehicle M captured by the camera 10 and the learning model 184. With the above-described process, the drive-in parking controller 142 can stop the host vehicle M in the stopping area without eaves 310b depending on the situation of the occupant P and allow the occupant P to board the host vehicle M without waiting until the platform area with eaves 320a is vacant to thereby shorten the time associated with boarding.

While a case in which the recognizer 130 recognizes whether the occupant P is wearing (or carrying) a raincoat on the basis of the learning model 184 and the image indicating a surrounding environment of the host vehicle M captured by the camera 10 during boarding of the occupant P has been described, there is no limitation thereto. The recognizer 130 may recognize whether the occupant P is wearing (or carrying) a raincoat on the basis of the learning model 184 and an image in which an appearance of the occupant P when alighting from the host vehicle M is captured by the camera 10 or a camera (not illustrated) imaging a vehicle interior, for example.

[Variation of State of Occupant P]

The fact that "the occupant P is not wearing (or carrying) a raincoat" is an example of a "case in which the appearance of the occupant P is such that being exposed to an external environment is not desirable", and without being limited thereto, the drive-in parking controller 142 may determine the second stopping mode as the stopping mode on the basis of a fact that "the occupant P is wearing a formal suit", a fact that "the occupant P is wearing a dress", or the like. In this case, the learning model 184 performs machine learning in advance using an image in which the occupant P wearing a formal suit is captured and an image in which the occupant P wearing a dress is captured. The fact that "the occupant P is carrying luggage which desirably is not exposed to rain" is an example of a "case in which the luggage of the occupant P is luggage which is desirably not exposed to an external environment", and without being limited thereto, the drive-in parking controller 142 may determine the second stopping mode as the stopping mode on the basis of a fact that "the occupant P is carrying a paper bag", a fact that "the occupant P is carrying a musical instrument such as a violin", or the like. In this case, the learning model 184 performs machine learning in advance using an image in which the occupant P carrying a paper bag is captured and an image in which the occupant P carrying a musical instrument is captured.

[Execution Conditions for Stopping Mode Determination Process]

While a case in which the drive-in parking controller 142 determines the stopping mode when the recognition result obtained by the recognizer 130 indicates that a rainfall phenomenon is occurring has been described, there is no limitation thereto. The drive-in parking controller 142 may determine the stopping mode when the influence of an external environment recognized by the recognizer 130 is larger than a predetermined reference (that is, the amount of rainfall resulting from a rainfall phenomenon is larger than a predetermined reference). For example, when the rainfall phenomenon is rain, the drive-in parking controller 142 may determine whether the amount of rainfall recognized by the recognizer 130 is larger than the predetermined reference. The drive-in parking controller 142 executes a stopping mode determination process on the basis of the correspondence information 182 and the state of the occupant P when it is determined that the amount of rainfall is larger than the predetermined reference and stops the host vehicle M at a position (for example, a position near the occupant P) determined by a basic process when it is determined that the amount of rainfall is not larger than the predetermined reference.

[Case in which Sunlight is Equal to or Larger than Predetermined Reference]

The drive-in parking controller 142 may determine the stopping mode on the basis of an external environment other than a rainfall phenomenon. For example, the drive-in parking controller 142 may determine the second stopping mode as the stopping mode on the basis of the correspondence information 182 and the recognition result obtained by the recognizer 130 when the recognition result obtained by the recognizer 130 indicates that the sun is shining at the boarding position and the occupant P is wearing (or carrying) anti-sunlight articles and stops the host vehicle M in the stopping area without eaves 310b. The correspondence information 182 includes information in which a recognition result that the recognizer 130 has recognized that the sun is shining at the boarding position, a recognition result that the recognizer 130 has recognized that the occupant P has taken countermeasures against sunlight, and the second stopping mode are correlated with each other. The fact that "the occupant P has taken countermeasures against sunlight" includes a fact that the occupant P is wearing (or carrying) anti-sunlight articles, for example. Examples of the anti-sunlight articles include a parasol, a hat, sunglasses, a sun visor, and the like.

In this case, the recognizer 130 recognizes the degree of sunlight at the boarding position on the basis of an image indicating a surrounding environment of the host vehicle M captured by the camera 10. The recognizer 130 recognizes that the sun is shining at the boarding position when the recognized degree of sunlight is equal to or larger than a predetermined reference value. The recognizer 130 recognizes whether the occupant P is wearing (or carrying) anti-sunlight articles on the basis of the learning model 184 and an image indicating a surrounding environment of the host vehicle M captured by the camera 10. In this case, the learning model 184 performs machine learning using at least one of an image in which a person wearing (or carrying) anti-sunlight articles is captured, which is training data of a positive example and an image in which a person not wearing (or carrying) anti-sunlight articles is captured, which is training data of a negative example. With the above-described process, the drive-in parking controller 142 can stop the host vehicle M in the stopping area without eaves 310b depending on the situation of the occupant P and allow the occupant P to board the host vehicle M without waiting until the platform area with eaves 320a is vacant to thereby shorten the time associated with boarding.

While a case in which the recognizer 130 recognizes the degree of sunlight at the boarding position on the basis of an image indicating a surrounding environment of the host vehicle M captured by the camera 10 has been described, there is no limitation thereto. For example, the drive-in parking controller 142 may estimate the degree of sunlight at the boarding position on the basis of weather information received by the communication device 20 from an external device via a network, the date and time (a period of time) when a drive-in parking event associated with exiting was executed, the height of the eaves 322, and the like. The weather information is information associated with the weather around the boarding position, for example. For example, the drive-in parking controller 142 may transmit the position of the host vehicle M acquired by the GNSS receiver 51 to an external device and receives the weather information associated with the position from the external device with the aid of the communication device 20. The drive-in parking controller 142 determines that the sun is shining at the boarding position when the degree of sunlight estimated on the basis of the acquired weather information or the like is equal to or larger than a predetermined reference value. The drive-in parking controller 142 is an example of an "estimator" in a scene of executing a process associated with estimating the degree of sunlight.

[Case in which a Plurality of Stopping Positions are Present in Stopping Area 310]

Figure 9:
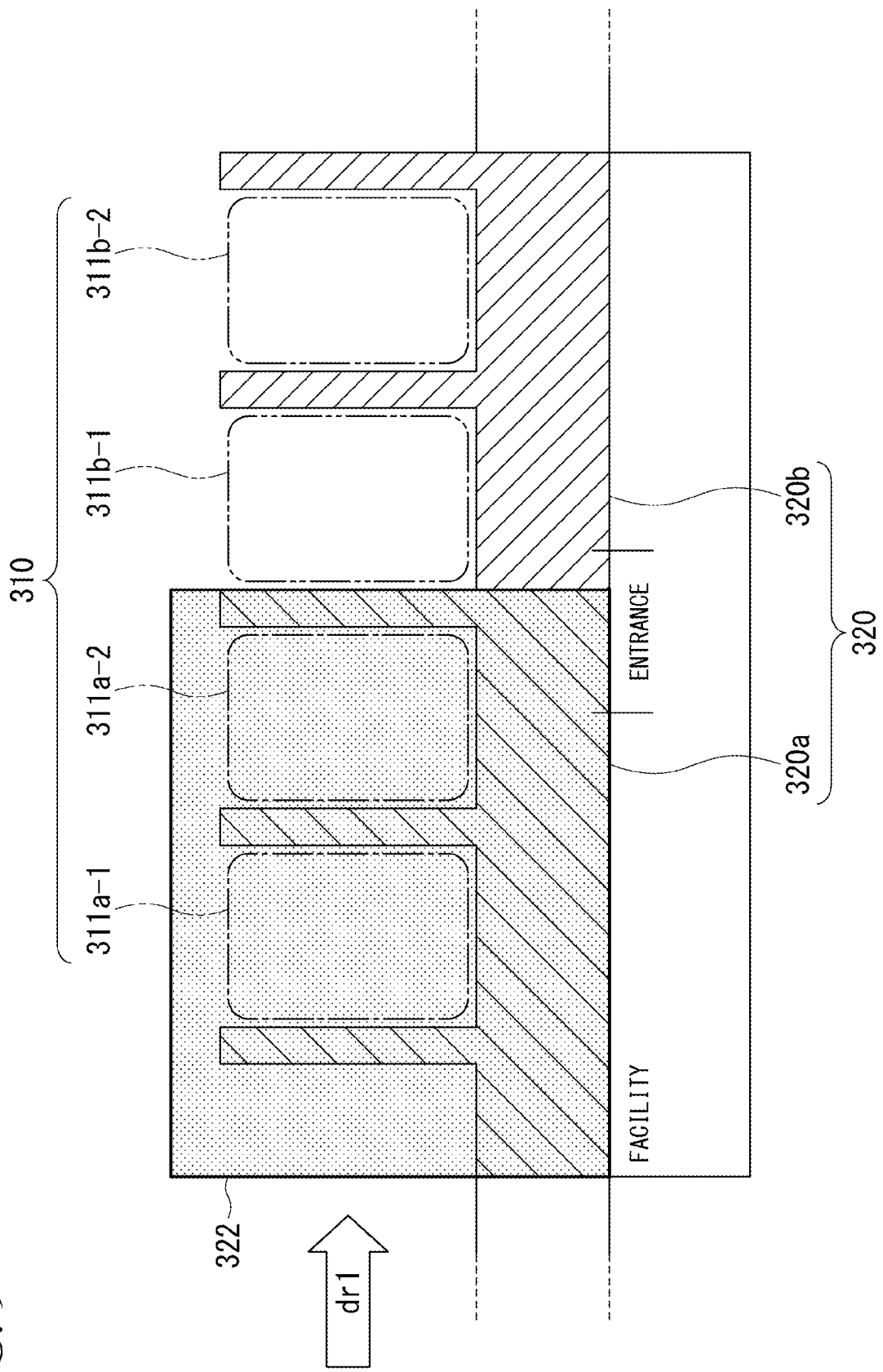
FIG. 9 is a diagram illustrating an example of a stopping area 310 in which a plurality of stopping positions are present.

FIG. 9 is a diagram illustrating an example of the stopping area 310 in which a plurality of stopping positions are present. Here, the stopping area 310 may be shaped such that vehicles park parallel to each other as illustrated in FIG. 9 rather than vehicles stopping (parking) in a line as described above. Hereinafter, it is assumed that the stopping area 310 includes one or more parking regions 311, and the parking regions 311 include a stopping region with eaves 311a (stopping regions with eaves 311a-1 to 311a-2 illustrated in the drawing) which is under the eaves 322 and is not or hardly influenced by an external environment and a stopping region without eaves 311b (stopping regions without eaves 311b-1 to 311b-2 illustrated in the drawing) which is not under the eaves 322 and is influenced by an external environment. The parking region 311 is an example of a "boarding position".

For example, when a stopping position is determined, the drive-in parking controller 142 determines a parking region 311 which is recognized to be in a better environment than the other parking regions 311 among the plurality of parking regions 311 as the stopping position. When it is determined that the host vehicle M is to be stopped according to the first stopping mode, for example, the drive-in parking controller 142 determines that the host vehicle M is to be stopped in the stopping region without eaves 311b-1 or the stopping region without eaves 311b-2 among the parking regions 311, selects a stopping region without eaves 311b being in a better environment among the stopping regions without eaves 311b-1 and 311b-2, and stops the host vehicle M in the selected stopping region without eaves.

Here, the stopping region without eaves 311b which is a better environment may be different depending on the situation of the occupant P. For example, the stopping region without eaves 311b being in a better environment is a stopping region without eaves 311b (in this example, the stopping region without eaves 311b-2) located closer in the traveling direction of the host vehicle M when the occupant P is in a hurry and is a stopping region without eaves 311b (in this example, the stopping region without eaves 311b-1) located closer to a visiting destination facility (specifically, the entrance thereof) when the occupant P is carrying much luggage. For example, when the recognition result obtained by the recognizer 130 indicates that the occupant P is performing gesture indicating hurrying (glancing at the watch, stepping hurriedly, moving about in confusion, or the like), the drive-in parking controller 142 selects the stopping region without eaves 311b-2 as the stopping region without eaves 311b being in a better environment and stops the host vehicle M in the selected stopping region without eaves. For example, when the recognition result obtained by the recognizer 130 indicates that the occupant P is carrying much luggage, the drive-in parking controller 142 selects the stopping region without eaves 311b-1 as the stopping region without eaves 311b being in a better environment and stops the host vehicle M in the selected stopping region without eaves. In this case, the learning model 184 performs machine learning in advance using an image in which the occupant P glancing at a watch, stepping hurriedly, moving about in confusion, or the like is captured and an image in which the occupant P carrying much luggage is captured.

When it is determined that the host vehicle M is to be stopped according to the second stopping mode, for example, the drive-in parking controller 142 determines that the host vehicle M is to be stopped in the stopping region with eaves 311a-1 or the stopping region with eaves 311a-2 among the parking regions 311, selects a stopping region with eaves 311a being in a better environment among the stopping regions with eaves 311a-1 and 311a-2, and stops the host vehicle M in the selected stopping region with eaves. When the drive-in parking controller 142 determines that the host vehicle M is to be stopped according to the second stopping mode, the stopping region with eaves 311*a* being in a better environment is the stopping region with eaves 311*a* which is less influenced by an external environment.

The drive-in parking controller 142 selects a stopping region with eaves 311*a* which is less influenced by an external environment on the basis of the recognition result obtained by the recognizer 130 (specifically, a direction of a substance falling on the ground due to a rainfall phenomenon, a wind direction, an incoming direction of sunlight, and the like) and stops the host vehicle M in the selected stopping region with eaves. In the example illustrated in FIG. 9, when rain falls from a direction dr, the stopping region with eaves 311*a*-1 is more likely to be exposed to rain among the stopping regions with eaves 311*a*-1 and 311*a*-2. Therefore, the stopping region with eaves 311*a*-2 is the stopping region with eaves 311*a* being in a better environment. In this case, the drive-in parking controller 142 stops the host vehicle M in the stopping region with eaves 311*a*-2. With the above-described process, the drive-in parking controller 142 can allow the occupant P to board the host vehicle M more smoothly.

[Operation Flow]

Figure 10:
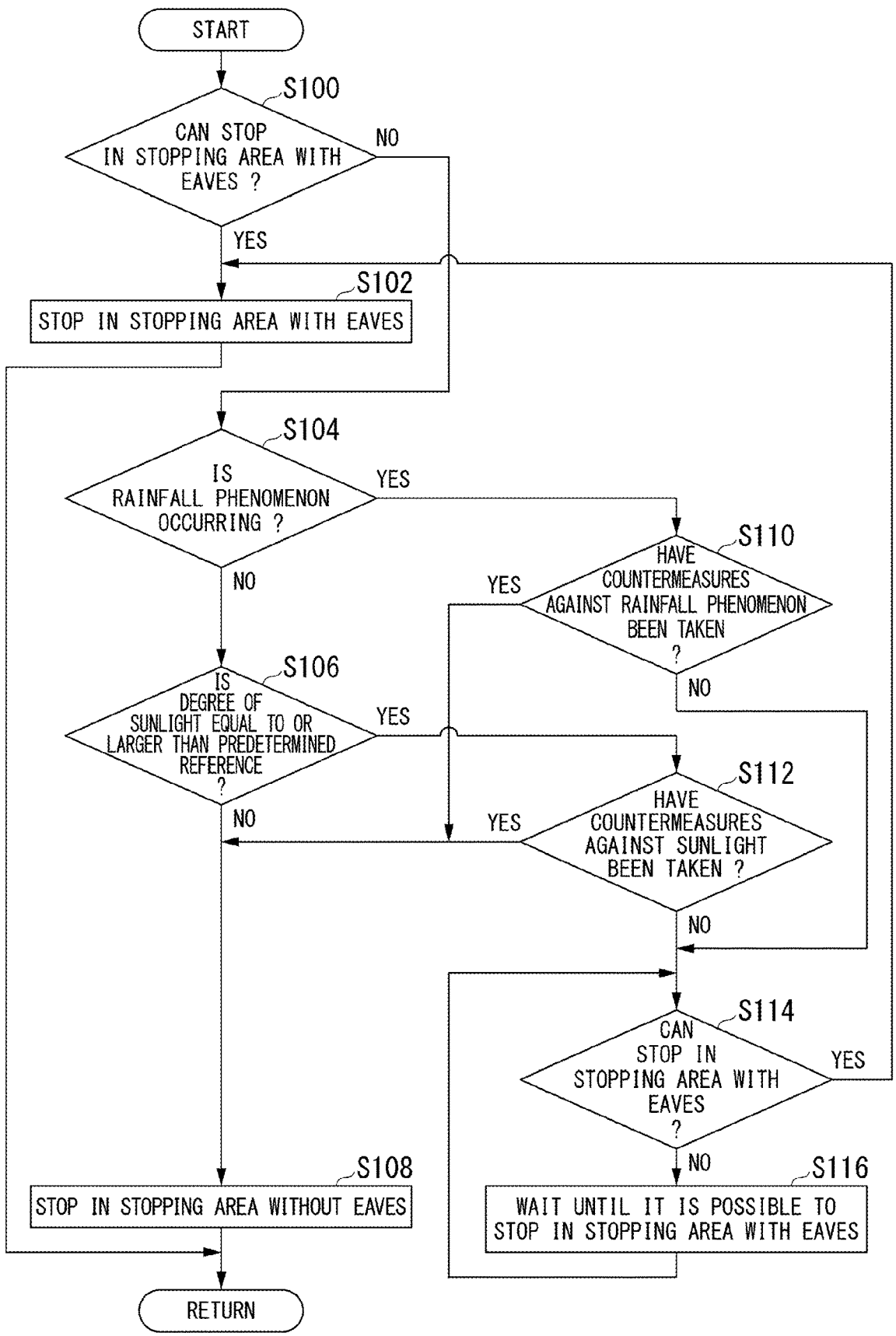
FIG. 10 is a flowchart illustrating an example of a series of processes of an automated driving control device 100 according to an embodiment.

FIG. 10 is a flowchart illustrating an example of a series of processes of the automated driving control device 100 according to the embodiment. The drive-in parking controller 142 determines whether the host vehicle M can be stopped in the stopping area with eaves 310*a* on the basis of the recognition result obtained by the recognizer 130 (step S100). When the host vehicle M can be stopped in the stopping area with eaves 310*a*, the drive-in parking controller 142 stops the host vehicle M in the stopping area with eaves 310*a* (step S102). When the host vehicle M cannot be stopped in the stopping area with eaves 310*a*, the drive-in parking controller 142 determines whether the recognition result obtained by the recognizer 130 indicates that a rainfall phenomenon involving a larger amount of rainfall than a predetermined reference is occurring (step S104). When the drive-in parking controller 142 determines that a rainfall phenomenon involving a larger amount of rainfall than a predetermined reference has not occurred, the recognizer 130 determines whether the recognized degree of sunlight at the boarding position is equal to or larger than a predetermined reference value (step S106). When it is determined that the degree of sunlight at the boarding position is not equal to or larger than the predetermined reference value, the recognizer 130 determines that the sun does not shine at the boarding position. When the recognizer 130 determines that the sun does not shine at the boarding position, the drive-in parking controller 142 stops the host vehicle M in the stopping area without eaves 310*b* since the occupant P is not influenced by the external environment (step S108).

When it is determined that the recognition result obtained by the recognizer 130 indicates that a rainfall phenomenon is occurring, the drive-in parking controller 142 determines whether the recognition result obtained by the recognizer 130 indicates that the occupant P has performed countermeasures against a rainfall phenomenon (for example, the occupant P is wearing (or carrying) a raincoat or carrying luggage for which it is acceptable if it becomes wet in rain) (step S110). The drive-in parking controller 142 determines the second stopping mode as the stopping mode on the basis of the correspondence information 182 and the recognition result indicating that the occupant P has taken countermeasures against a rainfall phenomenon and stops the host vehicle M in the stopping area without eaves 310*b* (step S108). When the recognition result obtained by the recognizer 130 indicates that the occupant P has not taken countermeasures against a rainfall phenomenon, the drive-in parking controller 142 proceeds to step S114. When the recognizer 130 has recognized that the sun is shining at the boarding position, the drive-in parking controller 142 determines whether the recognition result obtained by the recognizer 130 indicates that the occupant P has taken countermeasures against sunlight (for example, the occupant P is wearing (or carrying) anti-sunlight articles) (step S112). The drive-in parking controller 142 may estimate the degree of sunlight at the boarding position on the basis of weather information received by the communication device 20 from an external device via a network, the date and time (a period of time) when a drive-in parking event associated with exiting was executed, the height of the eaves 322, and the like. The drive-in parking controller 142 determines the first stopping mode as the stopping mode on the basis of the correspondence information 182 and the recognition result indicating that the occupant P has taken countermeasures against sunlight and stops the host vehicle M in the stopping area without eaves 310*b* (step S108).

The drive-in parking controller 142 determines the second stopping mode as the stopping mode when a rainfall phenomenon is occurring but the occupant P has not taken countermeasures against a rainfall phenomenon or when the sun is shining at the boarding position but the occupant P has not taken countermeasures against sunlight and determines whether the host vehicle M can be stopped in the stopping area with eaves 310*a* (step S114). When it is determined that the host vehicle M cannot be stopped in the stopping area with eaves 310*a*, the drive-in parking controller 142 waits (step S116) until the host vehicle M can be stopped, and proceeds to step S114. When it is determined that the host vehicle M can be stopped in the stopping area with eaves 310*a*, the drive-in parking controller 142 stops the host vehicle M in the stopping area with eaves 310*a* (step S102).

The drive-in parking controller 142 may determine whether a bad weather is occurring rather than determining whether a rainfall phenomenon is occurring. In this case, the drive-in parking controller 142 may determine in the process of step S104, for example, whether a bad weather is occurring on the basis of the amount of rainfall, the speed of wind, and a temperature. In this case, the drive-in parking controller 142 may determine that a bad weather is occurring when at least one index among the amount of rainfall, the speed of wind, and a temperature is equal to or smaller than a predetermined reference, for example. In this way, the drive-in parking controller 142 determines that a bad weather is occurring when the wind is strong or the temperature is too high or too low even if the amount of rainfall is equal to or smaller than a predetermined reference.

The drive-in parking controller 142 may make comprehensive determination on the basis of the degree of sunlight, the speed of wind, and a temperature with respect to the determination associated with sunlight. In this case, when the degree of sunlight is equal to or larger than a predetermined reference or when at least one index of the speed of wind and a temperature is equal to or smaller than a predetermined reference, the drive-in parking controller 142 determines that the sunlight (weather) is not desirable for the occupant P to board or alight from the host vehicle M in the stopping area without eaves 310*b*. In this way, the drive-in parking controller 142 determines that the host vehicle M is to be stopped in the stopping area with eaves 310*a* when the sunlight is strong, the wind is strong, and the temperature is too high or too low. The fact that a rainfall phenomenon is occurring, the sunlight is strong, the wind is strong, and the temperature is too high or too low is an example of a fact that "weather is bad".

<Modification>

Hereinafter, modifications of a vehicle control device, a vehicle control method, and a storage medium of the present invention will be described with reference to the drawings. In the modification, a case in which the occupant P is notified of changes in weather (changes in influence of an external environment) will be described. Components having similar configurations to those of the above-described embodiment will be denoted by the same reference numerals, and the description thereof will be omitted.

Figure 11:
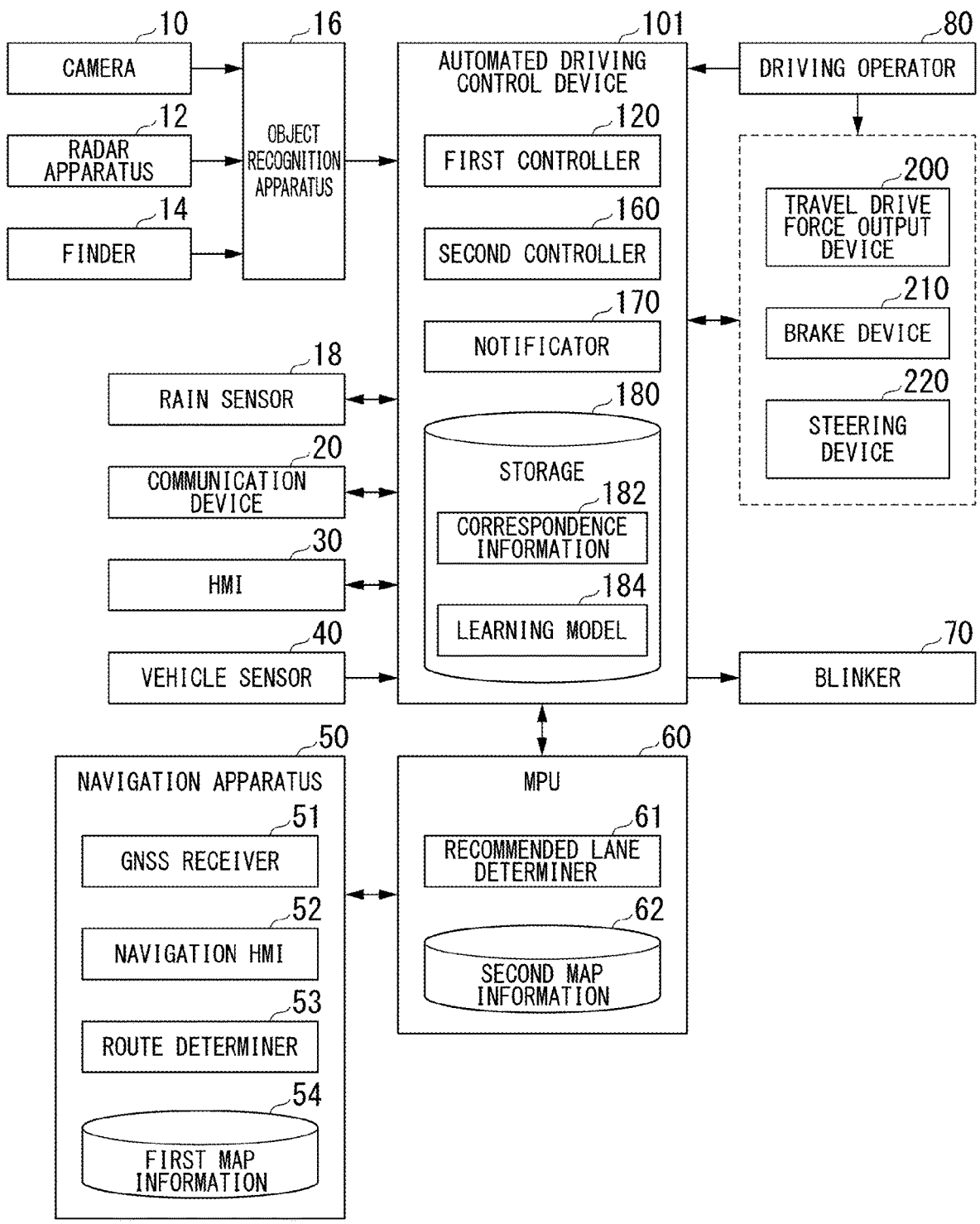
FIG. 11 is a block diagram of a vehicle control system 1a which uses a vehicle control device according to a modification.

FIG. 11 is a block diagram of a vehicle control system 1a which uses a vehicle control device according to a modification. The vehicle control system 1a includes, for example, a camera 10, a radar apparatus 12, a finder 14, an object recognition apparatus 16, a rain sensor 18, a communication device 20, a human machine interface (HMI) 30, a vehicle sensor 40, a navigation apparatus 50, a map positioning unit (MPU) 60, a blinker 70, a driving operator 80, an automated driving control device 101, a travel drive force output device 200, a brake device 210, and a steering device 220.

The automated driving control device 101 includes a first controller 120, a second controller 160, a notificator 170, and a storage 180. The notificator 170 notifies the terminal device TM carried by the occupant P of the host vehicle M of various pieces of information. The terminal device TM is realized, for example, by a mobile communication terminal device such as a smartphone or a portable personal computer such as a tablet computer (a table PC). The notificator 170 communicates with the terminal device TM using a cellular network, a Wi-Fi network, Bluetooth, WAN, LAN, Internet, and the like with the aid of the communication device 20 and notifies the occupant P of the host vehicle M of various pieces of information.

In the modification, it is assumed that the drive-in parking controller 142 starts a drive-in parking event associated with exiting at an instruction time instructed in advance from the occupant P. Here, the notificator 170 acquires weather information received by the communication device 20 via a network from an external device at a time point (for example, several minutes before) slightly before the instruction time. The notificator 170 notifies the terminal device TM of information proposing to change the instruction time when the acquired weather information indicates that the weather at the instruction time is bad (for example, occurrence of a rainfall phenomenon, sunshine at the boarding position). The notificator 170 is an example of a "weather information acquirer" in a scene of executing a weather information acquisition process.

Figure 12:
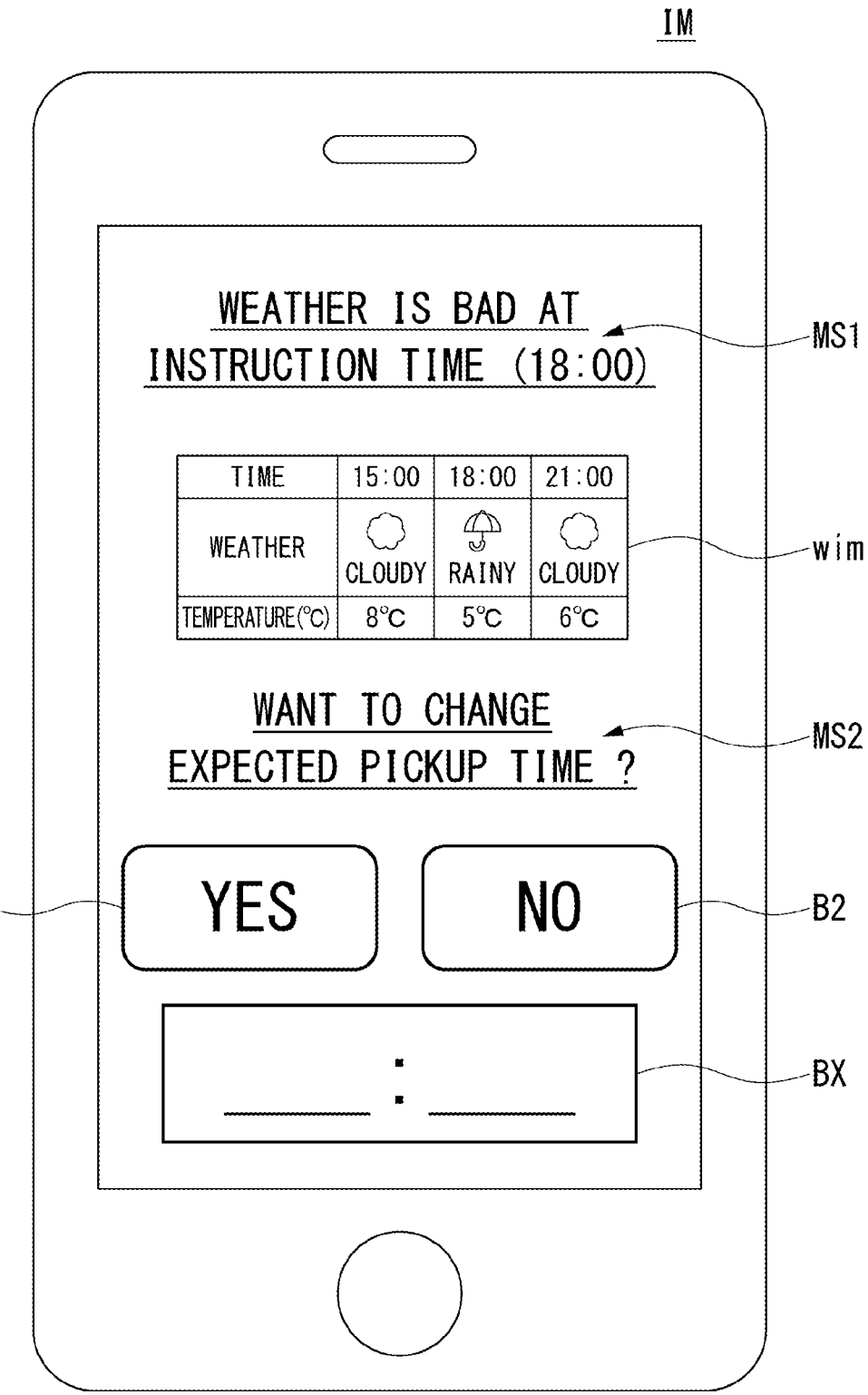
FIG. 12 is a diagram illustrating an example of an execution screen IM of a notification application executed in a terminal device TM.

FIG. 12 is a diagram illustrating an example of an execution screen IM of a notification application executed in the terminal device TM. The notification application is an application executed in the terminal device TM and is an application of notifying the occupant P of information acquired from the automated driving control device 101. The execution screen IM includes, for example, a message MS1 informing that the weather of the boarding position at the instruction time is bad, a weather image wim indicating changes in weather, a message MS2 for prompting to change the instruction time, a button B1 indicating the occupant P agrees on the message MS2, a button B2 indicating that the occupant P does not agree on the message MS2, and a box BX for inputting an instruction time after change.

When the button B1 is selected in the terminal device TM, the drive-in parking controller 142 starts the drive-in parking event associated with exiting at the instruction time instructed in advance. When the button B2 is selected in the terminal device TM, the drive-in parking controller 142 starts the drive-in parking event associated with exiting at the instruction time received by the communication device 20 and designated by the terminal device TM. In this way, the drive-in parking controller 142 can allow the occupant P to board the host vehicle M more smoothly.

[Operation Flow]

Figure 13:
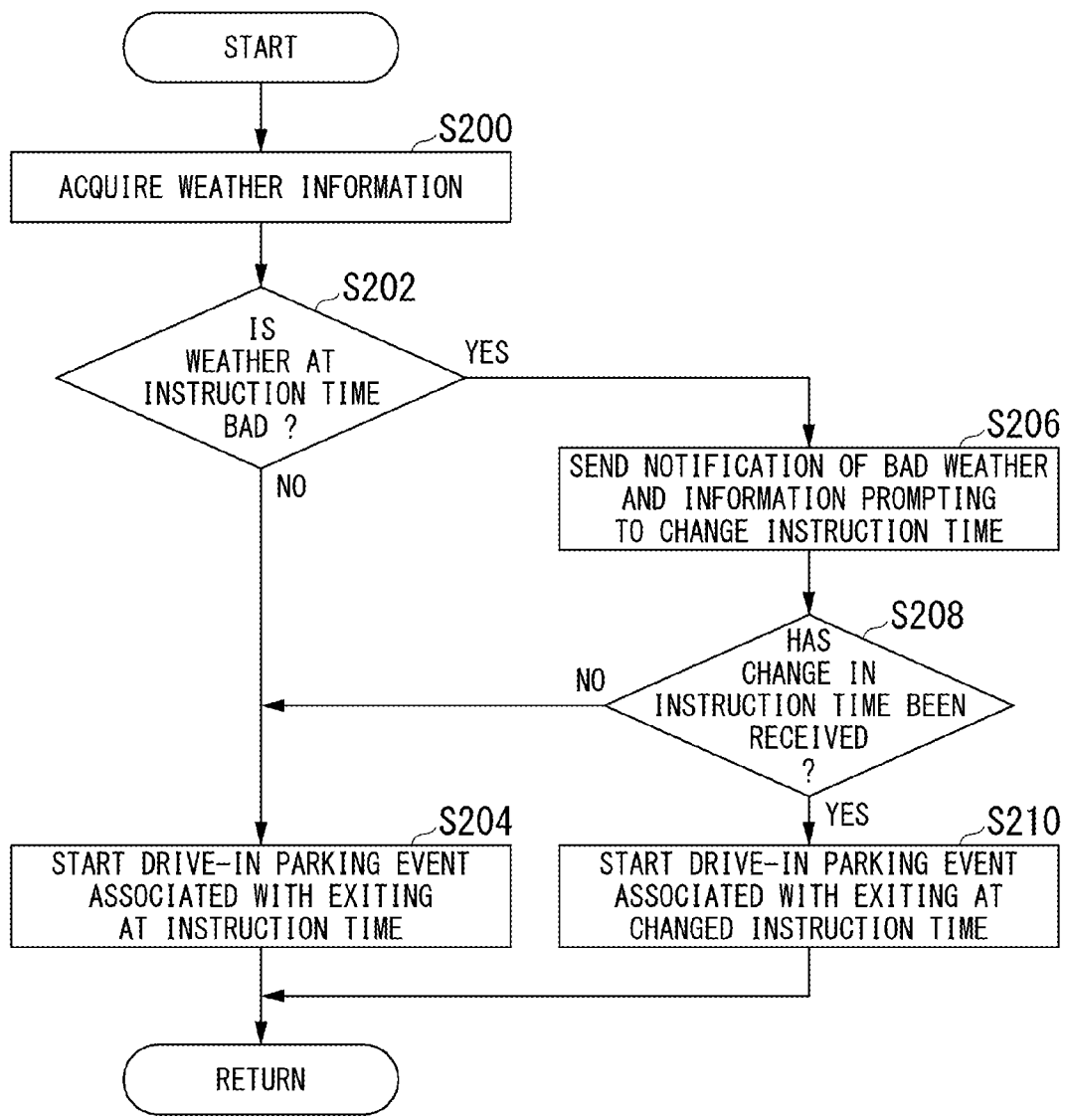
FIG. 13 is a flowchart illustrating an example of a series of processes of an automated driving control device 101 according to a modification.

FIG. 13 is a flowchart illustrating an example of a series of processes of the automated driving control device 101 according to the modification. The notificator 170 acquires weather information at a time point slightly before the instruction time (step S200). The notificator 170 determines whether the weather at the instruction time is bad on the basis of the acquired weather information and the instruction time (step S202). When the notificator 170 determines that the weather at the instruction time is not bad, the drive-in parking controller 142 starts a drive-in parking event associated with exiting at the instruction time instructed in advance (step S204). When the notificator 170 determines that the weather at the instruction time is bad, the notificator 170 notifies the terminal device TM of the bad weather and prompts the terminal device TM to change the instruction time (step S206). The drive-in parking controller 142 determines whether change in the instruction time has been received from the terminal device TM in response to the notification of the notificator 170 (step S206). When change in the instruction time has not been received from the terminal device TM, the drive-in parking controller 142 starts a drive-in parking event associated with exiting at the instruction time instructed in advance (step S204). When change in the instruction time has been received from the terminal device TM, the drive-in parking controller 142 starts a drive-in parking event associated with exiting at the instruction time after change (step S208).

While a case in which the notificator 170 determines whether the weather is bad at a time point slightly earlier than the instruction time has been described, there is no limitation thereto. The notificator 170 may determine whether the weather is bad every predetermined time interval (for example, several minutes to several tens of minutes) after the occupant P alights from the host vehicle M. In this case, the notificator 170 notifies the terminal device TM of the bad weather and prompts the terminal device TM to change the instruction time at a timing at which it was determined that the weather is bad.

The notificator 170 may send a notification to ask whether the occupant wants to board the host vehicle in the platform area with eaves 320a or the platform area without eaves 320b when the instruction time has arrived or when an exit request was received from the terminal device TM. The drive-in parking controller 142 stops the host vehicle M in the stopping area with eaves 310a or the stopping area without eaves 310b depending on the boarding position desired by the occupant P received in response to the notification of the notificator 170. When the parking area management device 400 expects that the stopping area with eaves 310a will be not congested at the instruction time or at a timing at which the exit request was received from the terminal device TM, the notificator 170 may not send a notification (asking) associated with the boarding position.

[Hardware Configuration]

Figure 14:
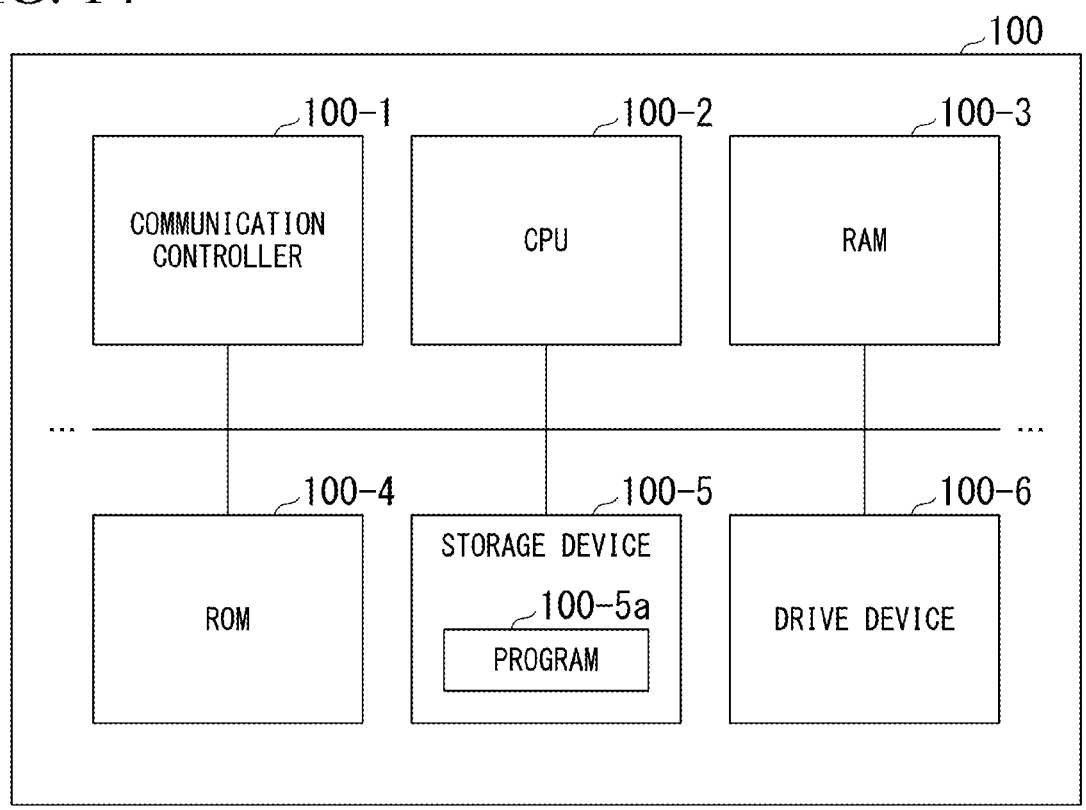
FIG. 14 is a diagram illustrating an example of a hardware configuration of the automated driving control device 100 of the embodiment.

FIG. 14 is a diagram illustrating an example of a hardware configuration of the automated driving control device 100 according to the embodiment. As illustrated in the drawing, the automated driving control device 100 includes a communication controller 100-1, a CPU 100-2, a random access memory (RAM) 100-3 used as a working memory, a read only memory (ROM) 100-4 storing a boot program or the like, a storage device 100-5 such as a flash memory or a hard disk drive (HDD), and a drive device 100-6 which are connected to each other by an internal bus or a dedicated communication line. The communication controller 100-1 communicates with the components other than the automated driving control device 100. A program 100-5a executed by the CPU 100-2 is stored in the storage device 100-5. This program is deployed onto the RAM 100-3 by a direct memory access (DMA) controller (not illustrated) or the like and is executed by the CPU 100-2. In this way, some or all components of the recognizer 130, the action plan generator 140, and the drive-in parking controller 142 are realized.

The above-described embodiments may be expressed as follows.

An automated driving control device including:

a storage device that stores a program; and a hardware processor, wherein the hardware processor executes the program stored in the storage device to execute:

recognizing a surrounding environment of a vehicle;

automatically performing speed control and steering control of the vehicle; and determining a stopping position of the vehicle on the basis of a recognized environment of the boarding position, weather information, and the state of the occupant when moving and stopping the vehicle at the boarding position at which the occupant boards the vehicle.

While modes for carrying out the present invention have been described using embodiments, the present invention is not limited to these embodiments, but various modifications and replacements can be made without departing from the spirit of the present invention.

What is claimed is:

1. A vehicle control system comprising:

a part of a program implemented by a processor using instructions stored in a memory that recognizes a surrounding environment of a vehicle; and a driving controller that performs speed control and steering control of the vehicle automatically on the basis of a recognition result obtained by the part of the program implemented by the processor using the instructions stored in the memory, wherein when the vehicle is moved to a boarding position at which an occupant boards the vehicle and is stopped, the driving controller stops the vehicle on the basis of at least one of weather information at the boarding position, a state of the occupant recognized by the part of the program implemented by the processor using the instructions stored in the memory, and an environment of the boarding position recognized by the part of the program implemented by the processor using the instructions stored in the memory and determines a stopping position of the vehicle according to the environment of the boarding position or the state of the occupant when the weather information is a predetermined state, wherein the state of the occupant includes an appearance of the occupant, and wherein when the appearance of the occupant recognized by the part of the program implemented by the processor using the instructions stored in the memory is an appearance which is not to be exposed to an external environment, the driving controller determines whether the vehicle can be stopped at a position at which the occupant is not influenced by the external environment, and when the driving controller determines that the vehicle cannot be stopped at the position at which the occupant is not influenced by the external environment, the driving controller has the vehicle wait until the vehicle can be stopped at the position at which the occupant is not influenced by the external environment.

2. The vehicle control system according to claim 1, wherein the environment of the boarding position includes the presence of eaves at the boarding position, and when the weather information indicates that the weather at the boarding position is bad, the driving controller determines the stopping position of the vehicle on the basis of the presence of eaves recognized by the part of the program implemented by the processor using the instructions stored in the memory and the state of the occupant.

3. The vehicle control system according to claim 1, wherein the environment of the boarding position includes a degree of sunlight at the boarding position, and when the degree of sunlight recognized by the part of the program implemented by the processor using the instructions stored in the memory is determined to be equal to or larger than a predetermined reference value, the driving controller stops the vehicle at a position at which the occupant is not hit by sunlight.

4. The vehicle control system according to claim 1, wherein the environment of the boarding position includes a degree of sunlight at the boarding position, the system further includes the part of the program implemented by the processor using the instructions stored in the memory that estimates the degree of sunlight at the boarding position in each time period, and when the degree of sunlight estimated by the part of the program implemented by the processor using instructions stored in the memory is determined to be equal to or larger than a predetermined reference value, the driving controller stops the vehicle at a position at which the occupant is not hit by sunlight.

5. The vehicle control system according to claim 1, wherein when a plurality of boarding positions are present, the driving controller stops the vehicle near a boarding position of which the environment is recognized to include the presence of eaves by the part of the program implemented by the processor using the instructions stored in the memory.

6. The vehicle control system according to claim 1, wherein when an influence of an external environment recognized by the part of the program implemented by the processor using the instructions stored in the memory equivalent is larger than a predetermined reference, the driving controller executes a process of determining a stopping position of the vehicle.

7. The vehicle control system according to claim 1, further comprising:
- a device that communicates with a terminal device carried by the occupant that notifies the terminal device of various pieces of information including weather information, wherein
- the driving controller moves and stops the vehicle at a boarding position at an instruction time instructed by the occupant, and
- when the weather information indicates that the weather at the instruction time is bad, the device that communicates with the terminal device carried by the occupant notifies the terminal device of information proposing to change the instruction time.

8. The vehicle control system according to claim 7, wherein
- the device that communicates with the terminal device carried by the occupant sends a notification to the terminal device, the notification asking whether the occupant will board the vehicle at a boarding position at which the occupant is not influenced by the external environment or a boarding position at which the occupant is influenced by the external environment, and
- the driving controller stops the vehicle at a position at which the occupant is not influenced by the external environment or a position at which the occupant is influenced by the external environment on the basis of information acquired from the terminal device in response to the notification of the device that communicates with the terminal device carried by the occupant.

9. The vehicle control system according to claim 8, wherein
- when the vehicle is moved to a boarding position at which an occupant boards the vehicle and is stopped, the device that communicates with the terminal device carried by the occupant does not send the notification if congestion is not expected at a boarding position at which the occupant is not influenced by the external environment.

10. The vehicle control system according to claim 1, further comprising:
- an illumination controller that controls an illumination provided in the vehicle, wherein
- when the vehicle is moved to the boarding position by the driving controller and the occupant of the vehicle is recognized by the part of the program implemented by the processor using the instructions stored in the memory, the illumination controller lights the illumination according to a predetermined lighting mode to notify the occupant of arrival of the vehicle.

11. A vehicle control method for causing a computer to execute:
- recognizing a surrounding environment of a vehicle;
- automatically performing speed control and steering control of the vehicle on the basis of a recognition result;
- when the vehicle is moved to a boarding position at which an occupant boards the vehicle and is stopped, stopping the vehicle on the basis of at least one of weather information at the boarding position, a recognized state of the occupant, and a recognized environment of the boarding position; and
- determining a stopping position of the vehicle according to the environment at the boarding position or the state of the occupant when the weather information is a predetermined state,
- wherein the state of the occupant includes an appearance of the occupant, and
- determining whether the vehicle can be stopped at a position at which the occupant is not influenced by the external environment when the appearance of the occupant recognized is an appearance which is not to be exposed to an external environment, and
- when determining that the vehicle cannot be stopped at the position at which the occupant is not influenced by the external environment, having the vehicle wait until the vehicle can be stopped at the position at which the occupant is not influenced by the external environment.

12. A computer-readable non-transitory storage medium storing a program for causing a computer to execute:
- recognizing a surrounding environment of a vehicle;
- automatically performing speed control and steering control of the vehicle on the basis of a recognition result;
- when the vehicle is moved to a boarding position at which an occupant boards the vehicle and is stopped, stopping the vehicle on the basis of at least one of weather information at the boarding position, a recognized state of the occupant, and a recognized environment of the boarding position; and
- determining a stopping position of the vehicle according to the environment at the boarding position or the state of the occupant when the weather information is a predetermined state,
- wherein the state of the occupant includes an appearance of the occupant, and
- determining whether the vehicle can be stopped at a position at which the occupant is not influenced by the external environment when the appearance of the occupant recognized is an appearance which is not to be exposed to an external environment, and
- when determining that the vehicle cannot be stopped at the position at which the occupant is not influenced by the external environment, having the vehicle wait until the vehicle can be stopped at the position at which the occupant is not influenced by the external environment.

* * * * *